(12) United States Patent
Plamper et al.

(10) Patent No.: US 6,364,794 B1
(45) Date of Patent: Apr. 2, 2002

(54) VARIABLE SPEED TRANSMISSION ASSEMBLY

(75) Inventors: Gerhard Plamper; Eric P. Plamper, both of Cleveland, OH (US)

(73) Assignee: Plymar, Ltd., Cleveland, OH (US)

( * ) Notice: Subject to any disclaimer, the term of this patent is extended or adjusted under 35 U.S.C. 154(b) by 0 days.

(21) Appl. No.: 09/406,072

(22) Filed: Sep. 27, 1999

(51) Int. Cl.⁷ .............................................. F16H 55/52
(52) U.S. Cl. .......................................... 474/27; 474/23
(58) Field of Search ........................... 474/27, 23, 903; 74/378; 192/69.1, 65, 51

(56) References Cited

U.S. PATENT DOCUMENTS

| | | | |
|---|---|---|---|
| 3,759,342 A | 9/1973 | Plamper | 180/70 |
| 3,777,585 A | 12/1973 | Plamper | 74/230.17 |
| 4,128,017 A | * 12/1978 | Clarke | 474/27 X |
| 4,132,121 A | * 1/1979 | Clarke | 474/27 |
| 4,176,560 A | * 12/1979 | Clarke | 474/27 |
| 4,364,735 A | 12/1982 | Plamper et al. | 474/14 |
| 5,897,450 A | 4/1999 | May | 474/32 |

OTHER PUBLICATIONS

Owner's Guide, Form No. 770–8251H, published 1998 or earlier.

* cited by examiner

*Primary Examiner*—Mary Ann Green
(74) *Attorney, Agent, or Firm*—Tarolli, Sundheim, Covell, Tummino & Szabo L.L.P.

(57) ABSTRACT

A vehicle drive assembly includes a directional control transmission assembly and a variable speed drive assembly. A transmission drive belt extends between the variable speed drive assembly and the directional control transmission assembly to transmit force from the variable speed drive assembly to the transmission assembly when the transmission assembly is in a forward drive condition and when the transmission assembly is in a reverse drive condition. A main drive belt extends between the variable speed drive assembly and a source of power to transmit force to the variable speed drive assembly. The drive assembly includes a linkage assembly operable to move the variable speed drive assembly toward the directional control transmission assembly to change the variable speed drive assembly from a first condition in which the directional control transmission assembly is driven at a relatively low speed and a second condition in which the directional control transmission assembly is driven at a high speed. The drive assembly includes a brake that is automatically operative by movement of the manual speed control to a slow/stop position.

30 Claims, 14 Drawing Sheets

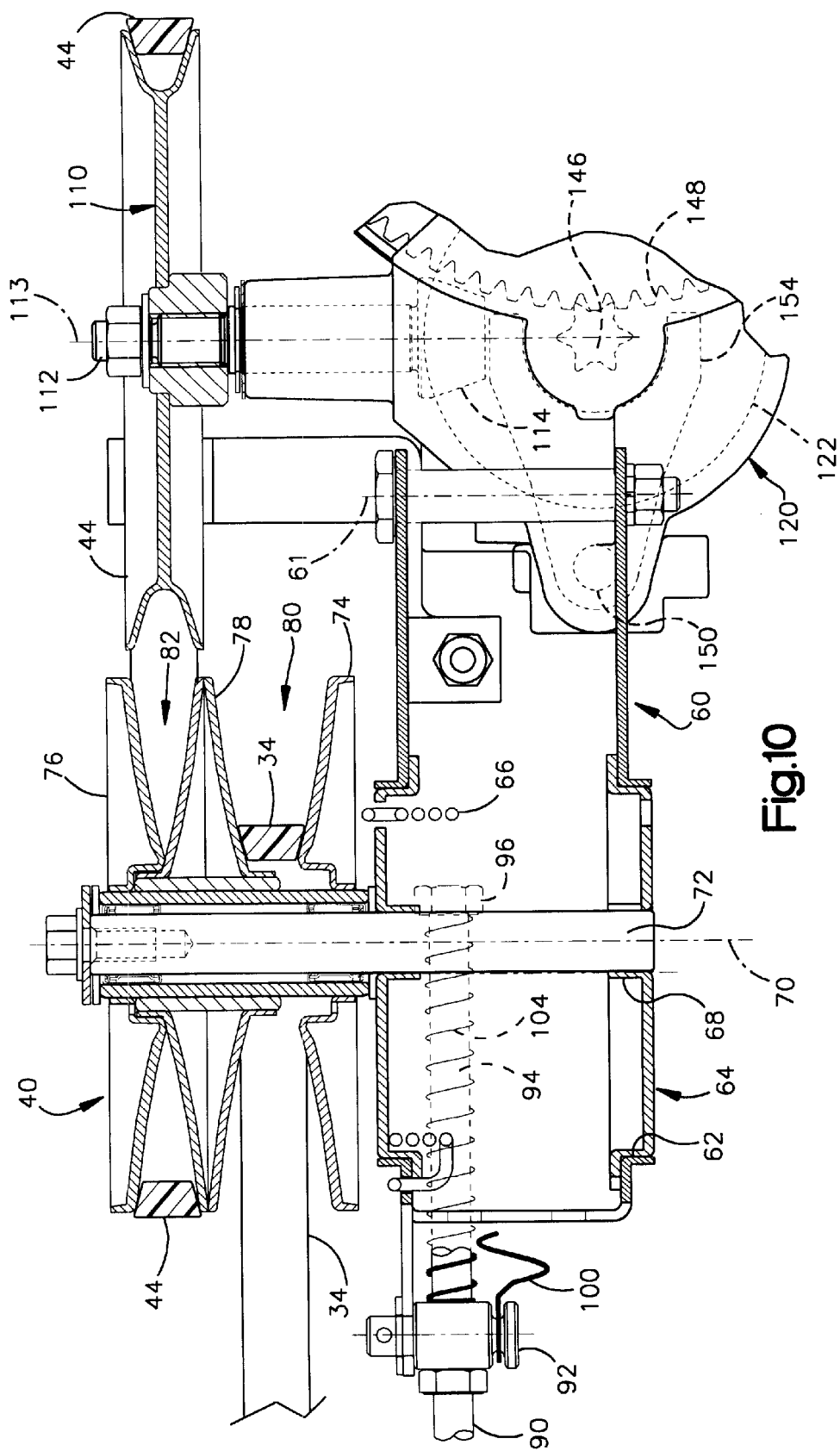

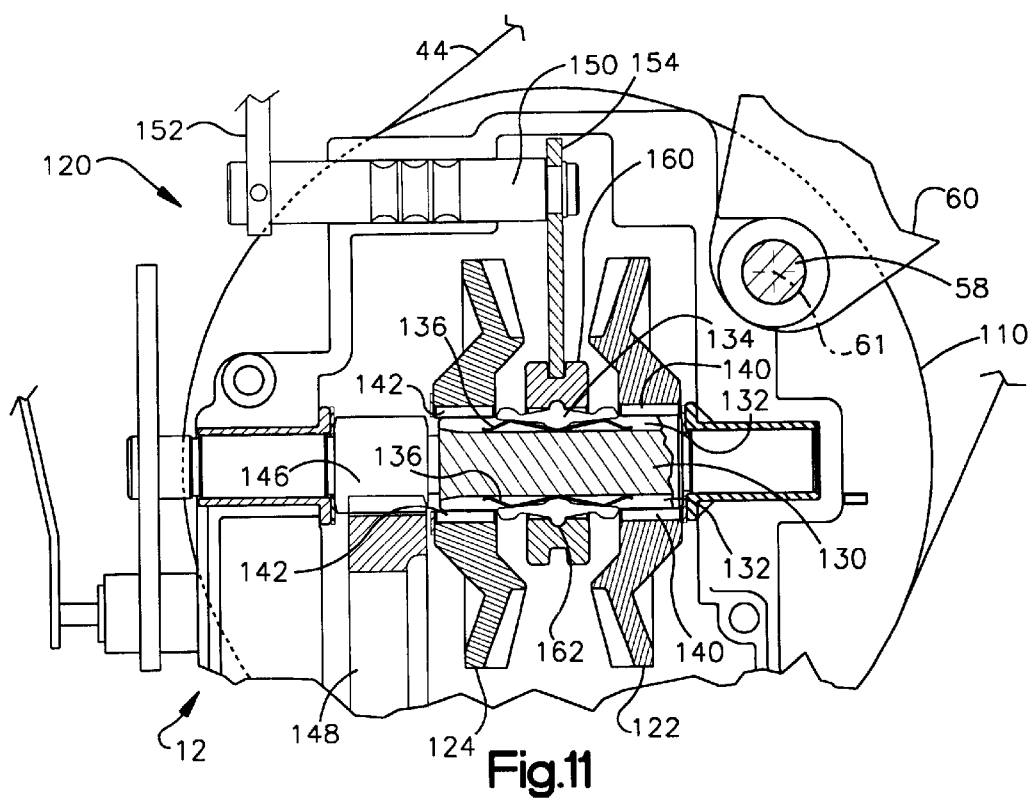
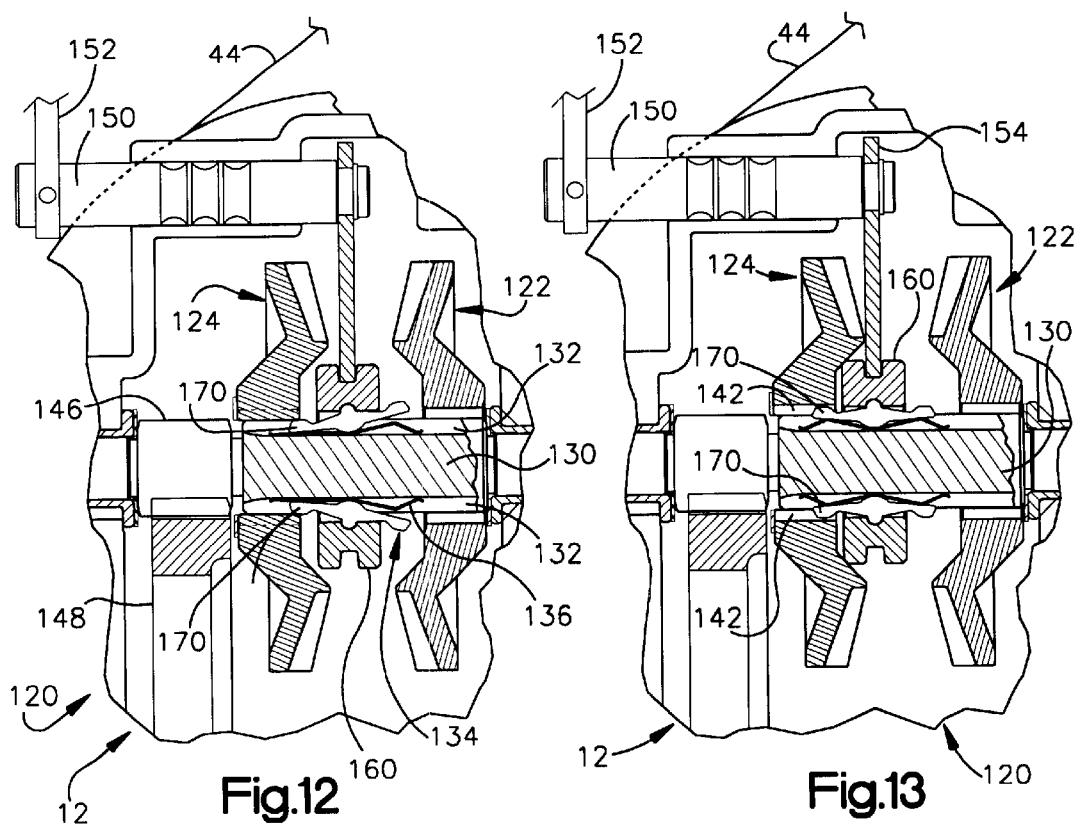

VARIABLE SPEED TRANSMISSION ASSEMBLY

BACKGROUND OF THE INVENTION

1. Technical Field

The present invention relates to a variable speed transmission assembly and, in particular, to such an assembly for use in a vehicle such as a lawn tractor.

2. Description of the Prior Art

U.S. Pat. No. 3,759,342 describes a lawn tractor having a variable speed drive assembly. The drive assembly includes a variable speed pulley mechanism supported on a bracket arm that pivots on a pin fixed to the frame. The bracket arm has a slot that receives the pin. The bracket arm slides relative to the pin, with the pin moving in the slot, to effect a second degree of movement of the variable speed pulley mechanism. The pin can sometimes become stuck in the slot, in a manner that prevents proper operation of the variable speed assembly.

SUMMARY OF THE INVENTION

The present invention is a vehicle drive assembly including a directional control transmission assembly operable between a forward drive condition and a reverse drive condition, and a variable speed drive assembly. The drive assembly also includes a transmission drive belt extending between the variable speed drive assembly and the directional control transmission assembly to transmit force from the variable speed drive assembly to the transmission assembly when the transmission assembly is in the forward drive condition and when the transmission assembly is in the reverse drive condition. The drive assembly also includes a main drive belt extending between the variable speed drive assembly and a source of power to transmit force to the variable speed drive assembly.

The drive assembly further includes a linkage assembly which is operable to move the variable speed drive assembly toward the directional control transmission assembly to change the variable speed drive assembly from a first condition in which the directional control transmission assembly is driven at a relatively low speed by force transmitted from the variable speed drive assembly to the directional control transmission assembly through the transmission drive belt and a second condition in which the variable speed drive assembly is effective to drive the directional control transmission assembly at a high speed.

In one embodiment, the linkage assembly includes an eccentric mechanism. In another embodiment, the linkage assembly includes a linkage arm. Other features of the present invention include a brake that is automatically operative by movement of the manual speed control to a slow/stop position, a reverse speed limiter, and the ability to manufacture and sell the vehicle drive assembly as all one unit for installation in a vehicle such as a lawn tractor.

BRIEF DESCRIPTION OF THE DRAWINGS

Further features of the present invention will become apparent to those skilled in the art to which the present invention relates from reading the following specification with reference to the accompanying drawings, in which:

FIG. 10 is a schematic view, partially in section and taken generally along line 10—10 of FIG. 9, of the vehicle drive assembly in the driving condition shown in FIG. 9, FIG. 11 is an enlarged view, partially in section, of a directional control transmission assembly that forms a part of the vehicle drive assembly of FIG. 1, shown in a neutral condition;

FIG. 12 is a view similar to FIG. 11 showing the directional control transmission assembly being moved into a driving condition;

FIG. 13 is a view similar to FIG. 12 showing the directional control transmission assembly engaged in the driving condition;

DESCRIPTION OF PREFERRED EMBODIMENTS

Figure 1:
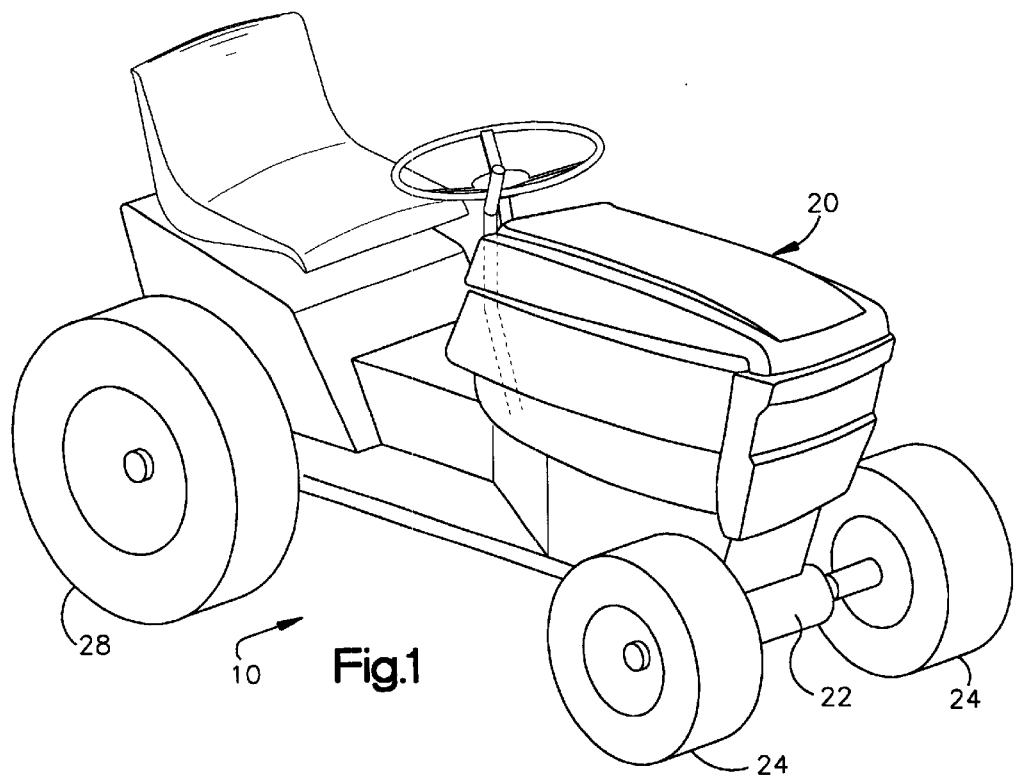
FIG. 1 is a pictorial view of a lawn tractor incorporating a vehicle drive assembly in accordance with the present invention.
Figure 2:
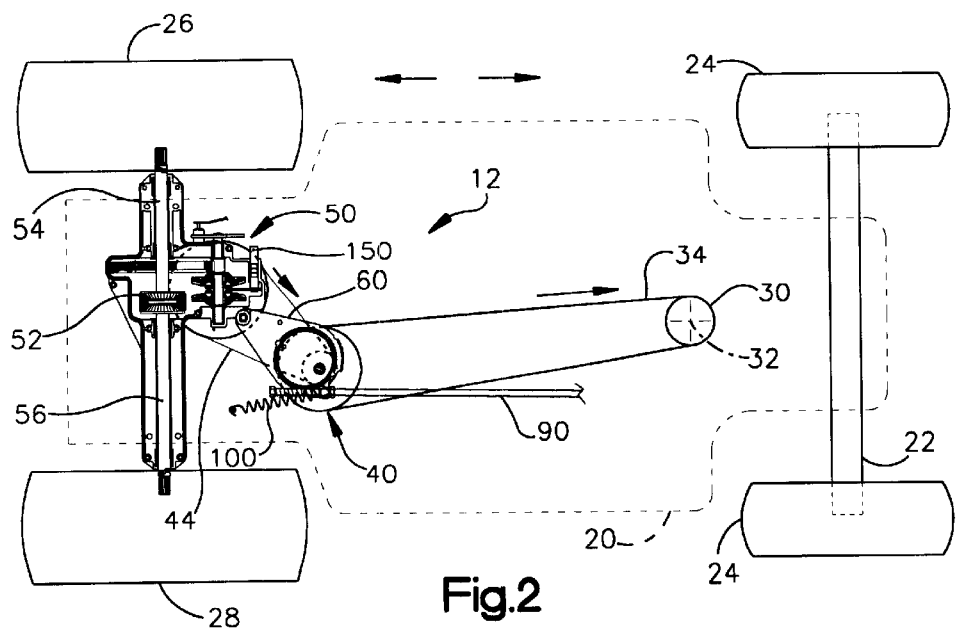
FIG. 2 is a schematic top plan view showing portions of the tractor of FIG. 1 including the vehicle drive assembly.

The present invention relates to a variable speed transmission assembly and, in particular, to such an assembly for use in a vehicle such as a lawn tractor. As representative of the present invention, FIGS. 1 and 2 illustrate a tractor 10 having a variable speed transmission assembly 12.

The tractor 10 includes a body assembly 20. The body assembly 20 supports a front axle 22 with left and right front steerable wheels 24. The tractor 10 includes drivable left and right rear wheels 26 and 28 for effecting driving movement of the tractor in a forward direction or a rear (backward) direction.

The tractor 10 includes an engine (not shown) that drives an engine output pulley 30 for rotation about a vertical axis 32. A main drive belt 34 is trained around the pulley 30. The main drive belt 34 extends rearward in the tractor 10 from the engine output pulley 30 to a variable speed pulley assembly 40 (described below in more detail).

A transmission drive belt 44 is trained around the variable speed pulley assembly 40. The transmission drive belt 44 extends rearward in the tractor 10 from the variable speed pulley assembly 40 to a directional control transmission assembly 50 of the tractor. The directional control transmission assembly 50 is described below in more detail. The output force of the directional control transmission assembly 50 is transmitted through a differential 52 and left and right half shafts 54 and 56 to the left and right wheels 26 and 28 of the tractor 10.

The directional control transmission assembly 50 (FIGS. 3 and 4) includes a transmission housing 57 fixed to the frame of the tractor 10. A bracket arm pivot shaft 58 is fixed to the transmission housing 57. The bracket arm pivot shaft 58 supports a bracket arm 60 for pivotal movement about a pivot axis 61.

Figure 7:
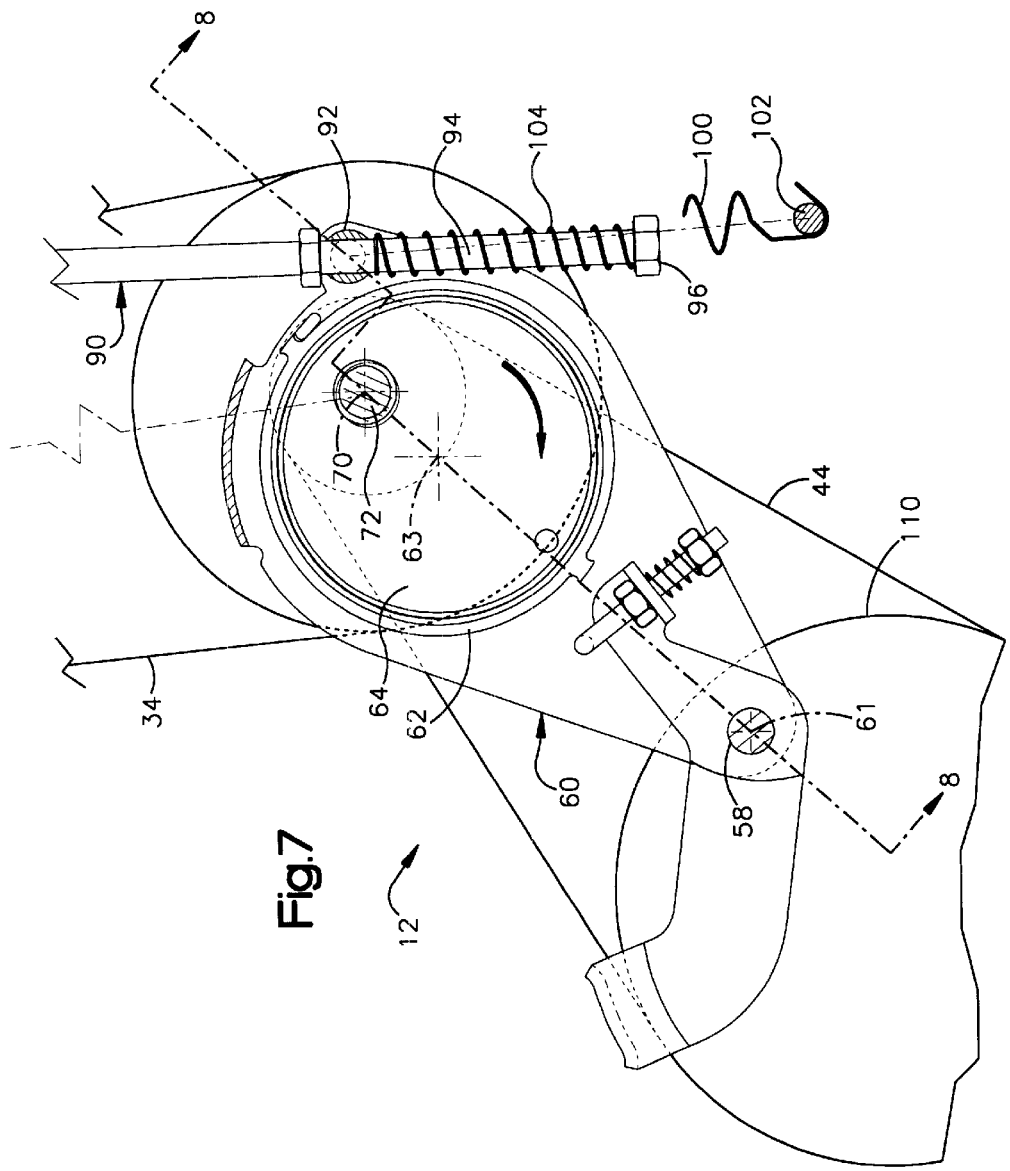
FIG. 7 is a schematic top view, partially in section, of the vehicle drive assembly shown in a slow speed driving condition, with the brake off.
Figure 8:
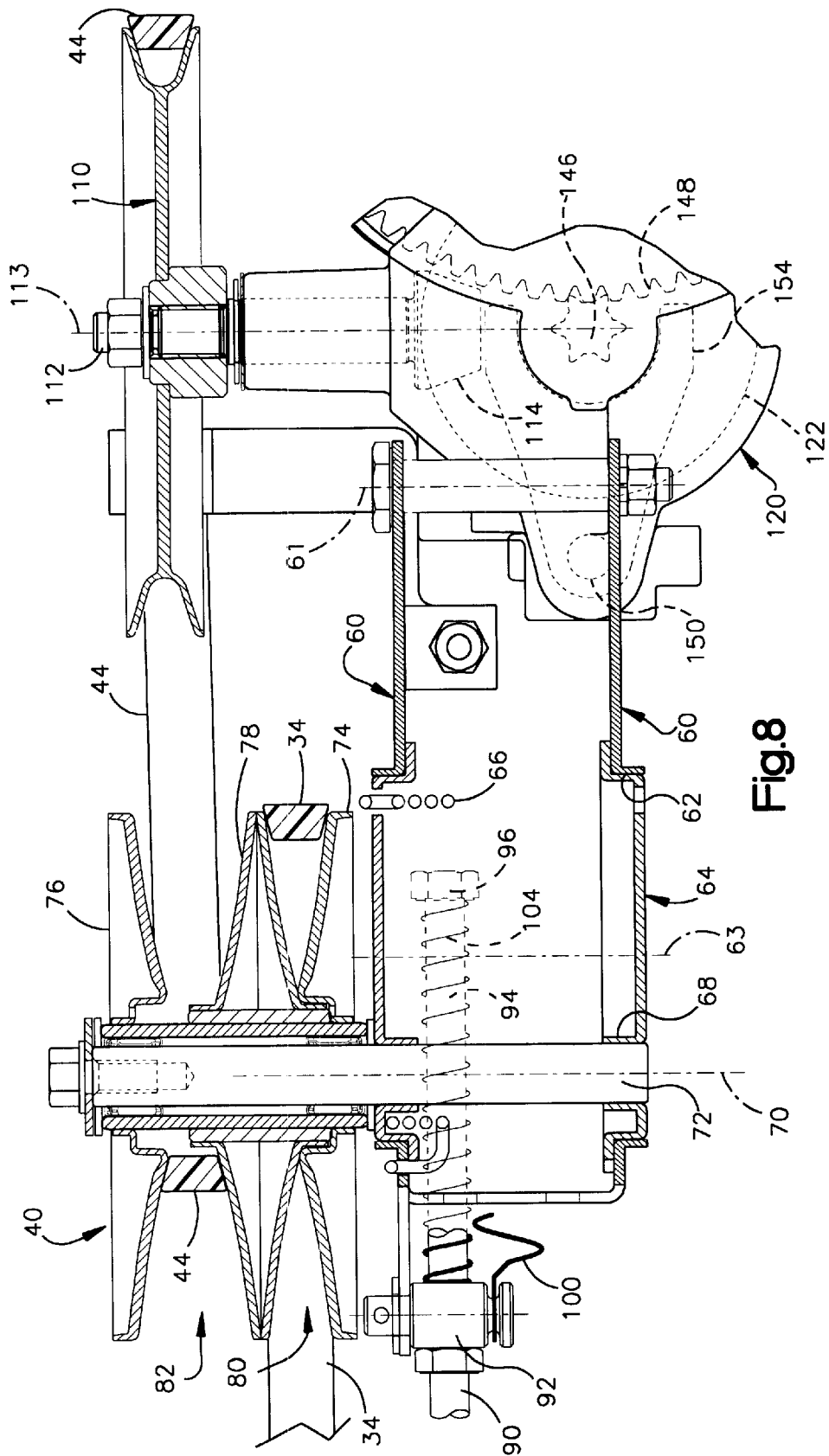
FIG. 8 is a schematic view, partially in section and taken generally along line 8—8 of FIG. 7, of the vehicle drive assembly in the driving condition shown in FIG. 7.
Figure 9:
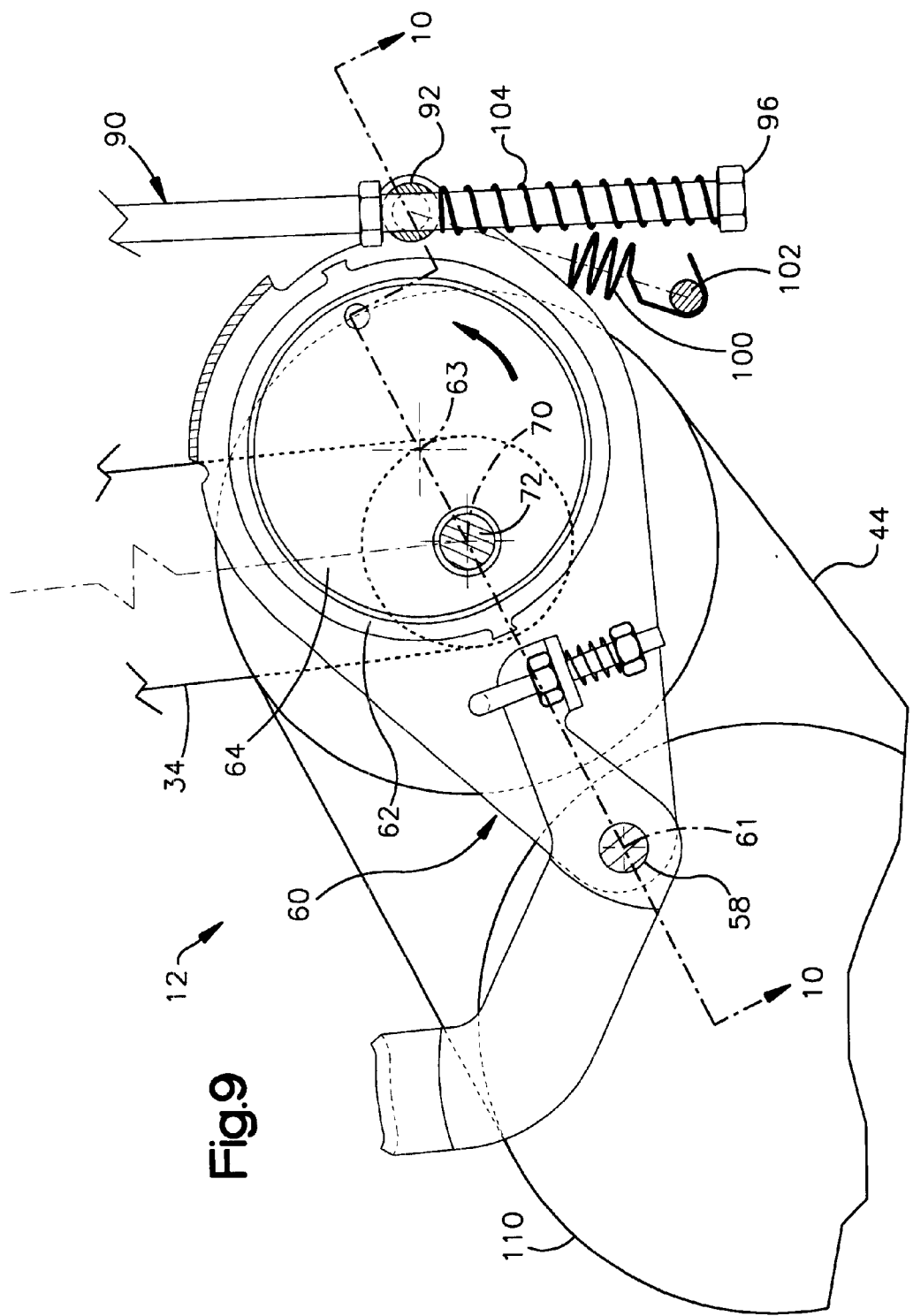
FIG. 9 is a schematic top view, partially in section, of the vehicle drive assembly shown in a high speed driving condition.
Figure 14:
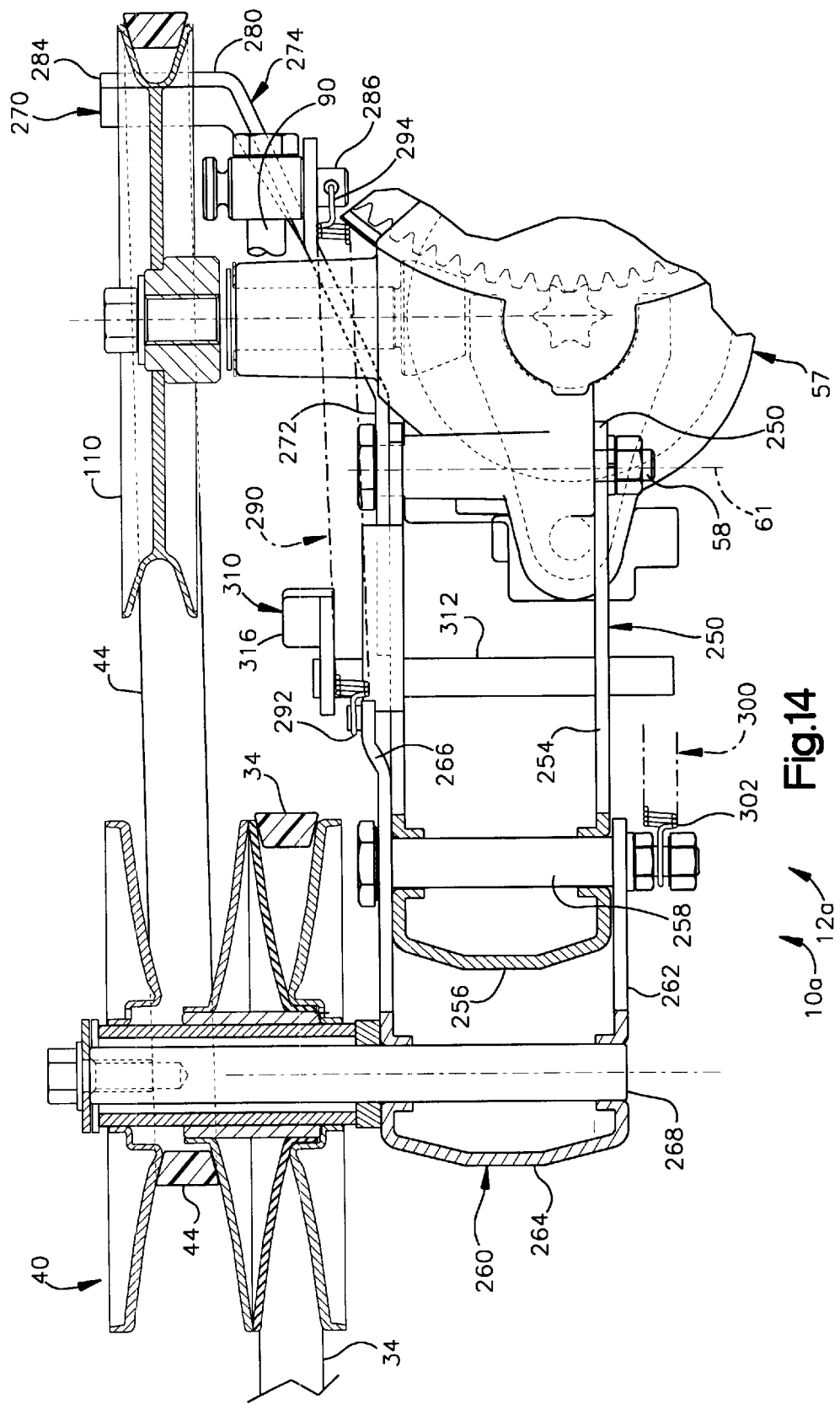
FIG. 14 is a view similar to FIG. 4 of a vehicle drive assembly constructed in accordance with a second embodiment of the invention, shown in a slow speed condition.

The bracket arm 60 has a large circular opening 62 centered on an axis 63. An eccentric 64 is rotatable in the opening 62 in the bracket arm 60. An eccentric spring 66 biases the eccentric 64 relative to the bracket arm 60 into a first position as shown in FIGS. 3–6. The eccentric 64 is rotatable within and relative to the bracket arm 60, against the biasing force of the eccentric spring 66, from the first position to a second position as shown in FIGS. 7 and 8, and a third position as shown in FIGS. 9 and 10. This movement is described below in more detail.

The eccentric 64 includes a hub 68. The hub 68 defines a variable speed pulley axis 70. The hub supports a variable speed pulley shaft 72 that extends along and is centered on the variable speed pulley axis 70.

The variable speed pulley assembly 40 is supported on the variable speed pulley shaft 72 for rotation about the axis 70. The variable speed pulley assembly 40 is of a known construction similar to that shown in the aforementioned U.S. Pat. No. 3,759,342 and in U.S. Pat. No. 5,897,450.

Specifically, the variable speed pulley assembly 40 includes an input pulley half 74, an output pulley half 76, and a center pulley half 78. The input pulley half 74 and the output pulley half 76 are fixed axially, and the center pulley half 78 is movable axially between them. The input pulley half 74 and the center pulley half 78 together form a variable diameter input pulley 80. The main drive belt 34 from the engine is trained around the variable diameter input pulley 80. The output pulley half 76 and the center pulley half 78 together form a variable diameter output pulley 82. The transmission drive belt 44 is trained around the variable diameter output pulley 82.

The variable diameter pulleys 80 and 82 are variable in width as the center pulley half 78 moves axially along the shaft 72. When the center pulley half 78 moves downward as viewed in FIG. 6, the variable diameter input pulley 80 becomes narrower and larger in diameter, and the variable diameter output pulley 82 becomes wider and smaller in diameter. Conversely, when the center half pulley 78 moves upward as viewed in FIG. 6, the variable diameter input pulley 80 becomes wider and smaller in diameter, and the variable diameter output pulley 82 becomes narrower and larger in diameter. Thus, axial movement of the center pulley half 78 changes the effective drive ratio between the main drive belt 34 and the transmission drive belt 44 and, as a result, the forward or backward speed of the tractor 10.

The tractor 10 includes a brake/accelerator rod 90 for controlling the position of the variable speed pulley assembly 40 and thus the speed of the tractor. The brake/accelerator rod 90 is a structure manually movable by a speed pedal (preferably) or speed handle (not shown) to change the speed of the vehicle and, as described below, to set a speed pedal brake 190 of the tractor 10. The brake/accelerator rod could be any other movable member for transmitting manual speed change instructions to the vehicle drive assembly.

The brake/accelerator rod 90 extends generally fore-and-aft in the tractor 10. The forward end of the brake/accelerator rod 90 is connected with the speed pedal (not shown). The brake/accelerator rod 90 extends through a bushing 92 on the bracket arm 60. A rearward end portion 94 of the brake/accelerator rod 90 extends past the bushing 92 and terminates in a radially enlarged head 96.

In the illustrated embodiment of the invention, the brake/accelerator rod 90 is connected to the bracket arm 60. However, the brake/accelerator rod could alternatively be connected to the eccentric if desired.

A clutch spring 100 (FIGS. 3 and 4) is connected between the bushing 92 (or another part on the bracket arm 60) and a fixed point 102 on the tractor body 20. The clutch spring 100 is a tension spring which exerts a pulling force on the bracket arm 60 and, thus, tends to pull the bracket arm and the variable speed pulley assembly 40 in a direction generally rearward in the tractor 10, that is, away from the engine output pulley 30.

A clutch override spring 104 extends between the bushing 92 and the head 96 of the brake/accelerator rod 90. The biasing effect of the clutch override spring 104 is such that the bushing 92 and thus the bracket arm 60 normally move with the brake/accelerator rod 90 as the brake/accelerator rod is moved forward and backward upon operation of the speed pedal. The clutch override spring 104 is compressible, as described below, to enable movement of the brake/accelerator rod 90 in a forward direction without accompanying movement of the bracket arm 60.

The transmission drive belt 44, which extends around the variable diameter output pulley 82 of the variable speed pulley assembly 40, also extends around a fixed diameter transmission pulley 110. The fixed diameter transmission pulley 110 is mounted on one end of a shaft 112 that is supported on the transmission housing 57 for rotation about an axis 113. Rotation of the fixed diameter transmission pulley 110 thus results in rotation of the shaft 112. A drive pinion 114 is disposed on the other end of the shaft 112 and is rotatable with the fixed diameter transmission pulley 110.

The drive pinion 114 is engageable with a directional control transmission assembly 120 of the tractor. The directional control transmission assembly 120 (best seen in FIGS. 11–13) includes forward and reverse bevel gears 122 and 124 rotatable about an axis 126 within the transmission housing 57. The forward and reverse bevel gears 122 and 124 are driven for rotation by the drive pinion 114 as described below.

The forward and reverse bevel gears 122 and 124 rotate around an output shaft 130 of the directional control transmission assembly 120. The output shaft 130 has two diametrically opposite slots 132 on its outer periphery. The slots 132 support a pair of keys 134. The keys 134 are slidable axially in the slots 132 in the shaft 130. The keys 134 are also pivotable in the slots 132. A pair of leaf springs 136 bias the keys 134 and help to control the position of the keys in the slots 132.

The forward bevel gear 122 has a pair of internal slots 140 that are diametrically opposite each other around the inner periphery of the forward bevel gear. The reverse bevel gear 124 has a pair of internal slots 142 that are diametrically opposite each other around the inner periphery of the reverse bevel gear. The keys 134 are selectively movable into the slots 140 or 142, in a manner described below, to engage the output shaft 130 for rotation with one or the other of the forward and reverse bevel gears 122 and 124.

The output shaft 130 of the directional control transmission assembly 120 is coupled through a gear 146 with a transmission output gear 148. The transmission output gear 148 is coupled in a known manner, through the differential 52, with the left half shaft 54 and the right half shaft 56. The differential 52, which for clarity is shown as being within the transmission housing 57, may be mounted in a separate differential housing.

The transmission housing 57 supports a shift actuator rod 150 for lateral sliding movement relative to the transmission housing. The shift actuator rod 150 is movable laterally by a shift actuator lever, a portion of which is shown schematically at 152. The shift actuator lever 152 is movable by a forward-reverse control mechanism (not shown) of the tractor 10.

Lateral movement of the shift actuator rod 150 is transmitted through a shift fork 154 to a shift collar 160. The shift collar 160 is slidable axially along the output shaft 130 of the directional control transmission assembly 120. The shift collar 160 has an internal groove 162 that receives radially projecting portions of the keys 134 so that axial sliding movement of the shift collar causes the keys to move axially in the slots 132 in the shaft 130. Such movement, as described below, results in the aforementioned coupling of the output shaft 130 for rotation with one or the other of the forward and reverse bevel gears 122 and 124.

The vehicle includes two brakes 180 and 190. The first brake 180 (FIG. 3) is a disc parking brake including a disc 182 which is rotatable with the output shaft 130. A brake actuator 184 is manually moved to the position shown in FIG. 3 to press a pair of brake pads 186 against the brake disc 182. Setting the parking brake 180 stops rotation of the output shaft 130. When the parking brake 180 is to be released, the brake actuator 184 is moved in a direction so as to move the pads 186 move axially outward away from the brake disc 182, and the parking brake 180 is released.

The second brake 190 is a speed pedal brake. The speed pedal brake 190 (FIG. 5) is usable whenever the transmission is in either forward or reverse (but not in neutral). The speed pedal brake 190 is actuated directly by the brake/accelerator rod 90.

The speed pedal brake 190 includes a brake lever 192. The brake lever 192 is a metal stamping that is supported on the transmission housing 57 for pivotal movement about the axis 61 relative to the transmission housing. The brake lever 192 has a first arm 194 that extends outward from the axis 61 and has an end portion 196 disposed radially outward of the transmission drive belt 44 where the belt wraps around the transmission drive pulley 110. The end portion 196 is movable radially, as described below, into engagement with the transmission drive belt 44 to press the drive belt in against the pulley 110 and thereby slow or stop rotation of the pulley and thus the vehicle.

The brake lever 192 includes a second arm 198 that extends outward from the axis 61 in a direction toward the variable speed pulley assembly 40, along the bracket arm 60. The second arm 198 has a flange 200 through which extends movably an L-shaped stop bolt 202. One leg 204 of the stop bolt 202 extends through an opening 206 in the bracket arm 60, thus making the stop bolt 202 movable with the bracket arm. The other leg 210 of the stop bolt 202 extends through the flange 200 on the brake lever 192. A pair of nuts 212 and 214 are screwed on the stop bolt 202 on opposite sides of the flange 200. A compression spring 216 is disposed between the one nut 212 and the flange 200.

Figure 5:
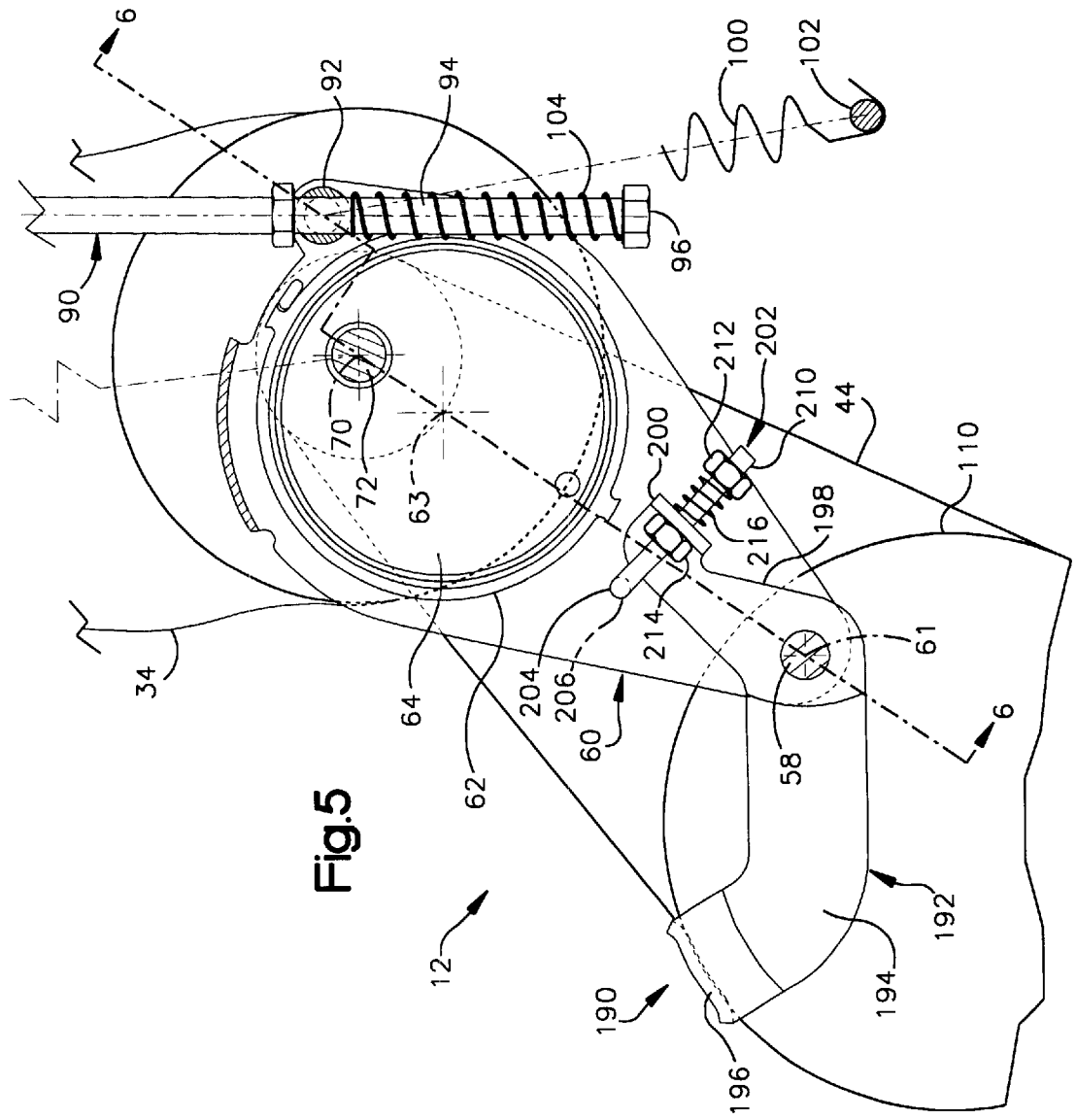
FIG. 5 is a schematic top view, partially in section, of the vehicle drive assembly shown in a neutral driving condition with the engine drive belt just becoming engaged to start movement of the tractor.

When the brake/accelerator rod 90 is moved in a direction to slow the tractor 10, the bracket arm 60 pivots about the axis 61, in a counterclockwise direction as viewed in FIG. 5. As the bracket arm 60 pivots, it moves the stop bolt 202 also. The stop bolt 202 acts through the nut 212 and the spring 216 to pivot the brake lever 192. The end portion 196 of the brake lever 192 engages the transmission drive belt 44. The brake lever 192 presses the drive belt 44 in against the pulley 110 and thereby slows or stop rotation of the pulley 110, depending on how far the brake/accelerator rod 90 is moved toward the stop position. (There could be a friction pad on the end portion 196 of the brake lever 192.)

Conversely, when the brake/accelerator rod 90 is moved in a direction to increase the speed of the tractor 10, the bracket arm 60 pivots about the axis 61, in a clockwise direction as viewed in FIG. 5. As the bracket arm 60 pivots, it moves the stop bolt 202 also. The stop bolt 202 pivots the brake lever 192 so that the end portion 196 of the brake lever moves radially outward away from the transmission drive belt 44, thus releasing the speed pedal brake 190.

The brake lever 192 is configured so that when the vehicle speed is set by the brake/accelerator rod 90 to a very slow speed, the speed pedal brake 190 is then in a position to engage. Thus, moving the brake/accelerator rod 90 from high speed to stop causes the following actions in the following order: the variable speed pulley assembly 40 moves to the slow position, then moves farther until the engine drive belt 34 becomes loose and driving force ceases, then the speed pedal brake 190 is applied. If the brake/accelerator rod is moved even farther, to engage the neutral start switch (not shown), then the spring 216 on the stop bolt 202 collapses, allowing the stop bolt and the bracket arm 60 to move farther without further addition of braking effect.

As the engine operates, the engine output pulley 30 rotates about the axis 32. When the speed pedal of the tractor 10 is pushed to the neutral or disengaged condition, the brake/accelerator rod 90 is pulled forward in the tractor (upward as viewed in FIG. 5, to the left as viewed in FIG. 6). The variable speed pulley assembly 40 is in a forwardmost position as shown in FIGS. 3–6.

Figure 3:
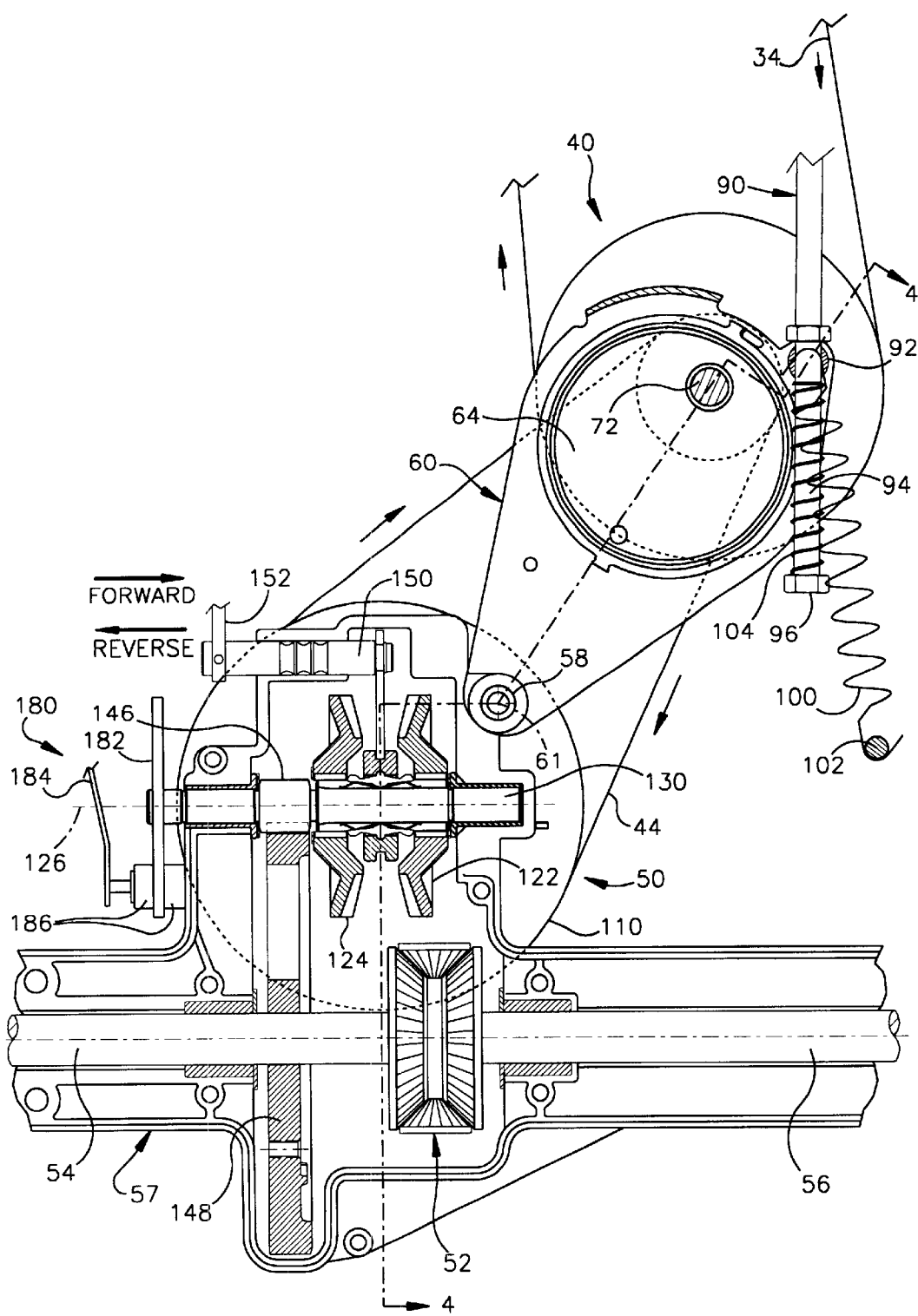
FIG. 3 is a schematic top view, partially in section, of the vehicle drive assembly shown in a neutral driving condition with the clutch fully depressed.
Figure 4:
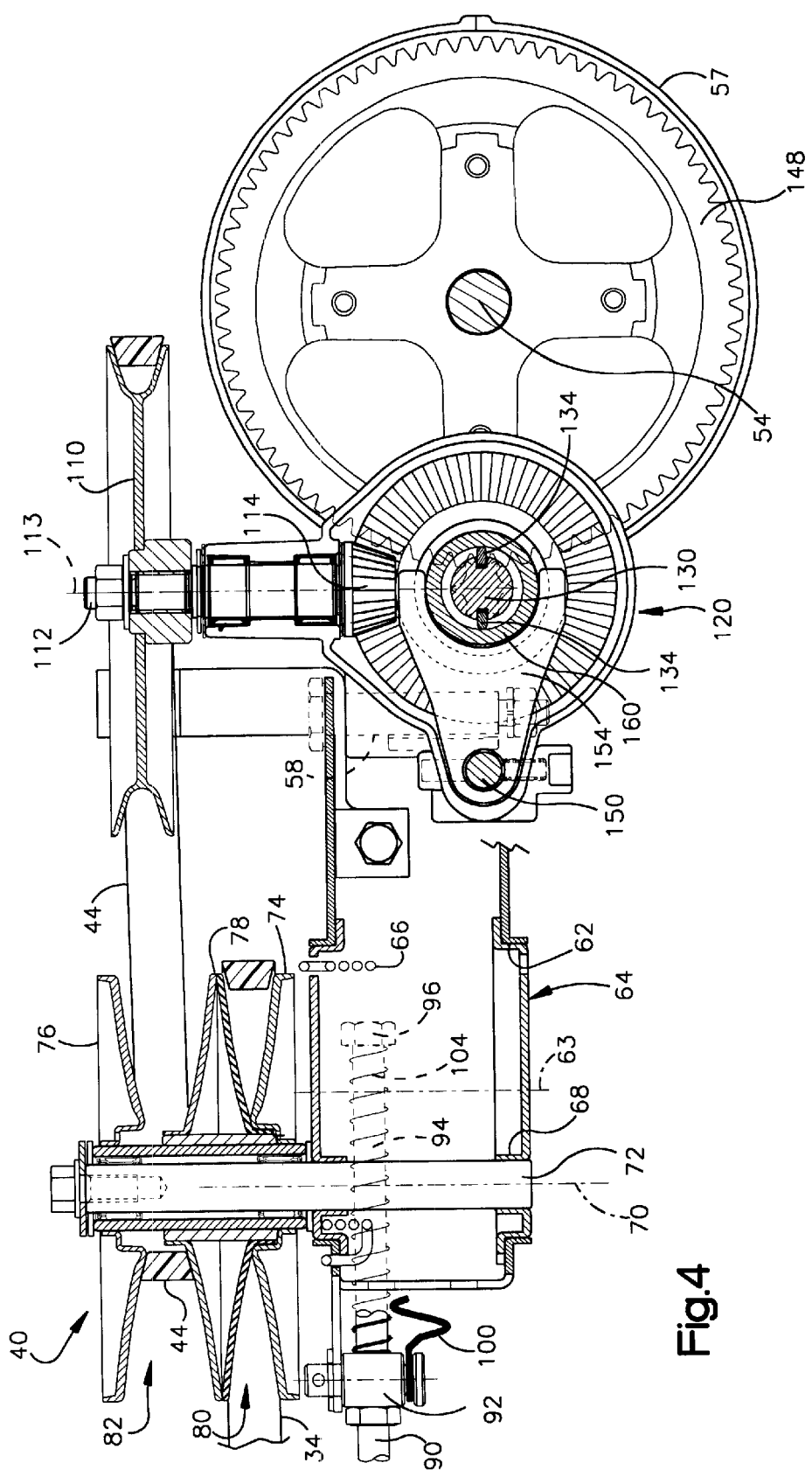
FIG. 4 is a schematic view, partially in section and taken generally along line 4—4 of FIG. 3, of the vehicle drive assembly in the driving condition shown in FIG. 3.

The variable diameter input pulley 82 has a minimum axial extent so that the main drive belt 34 is in the radially outermost position as shown in FIGS. 3–4. This results in slippage between the main drive belt 34 and the engine output pulley 30 also.

The variable diameter output pulley 82 has a maximum axial extent so that the transmission drive belt 44 is in the radially inward position shown in FIGS. 3–6. Since there is slippage between the main drive belt 34 and the engine output pulley 30, there is no effective force input to the variable speed pulley assembly 40, and no force is applied to the transmission drive belt 44.

Figure 6:
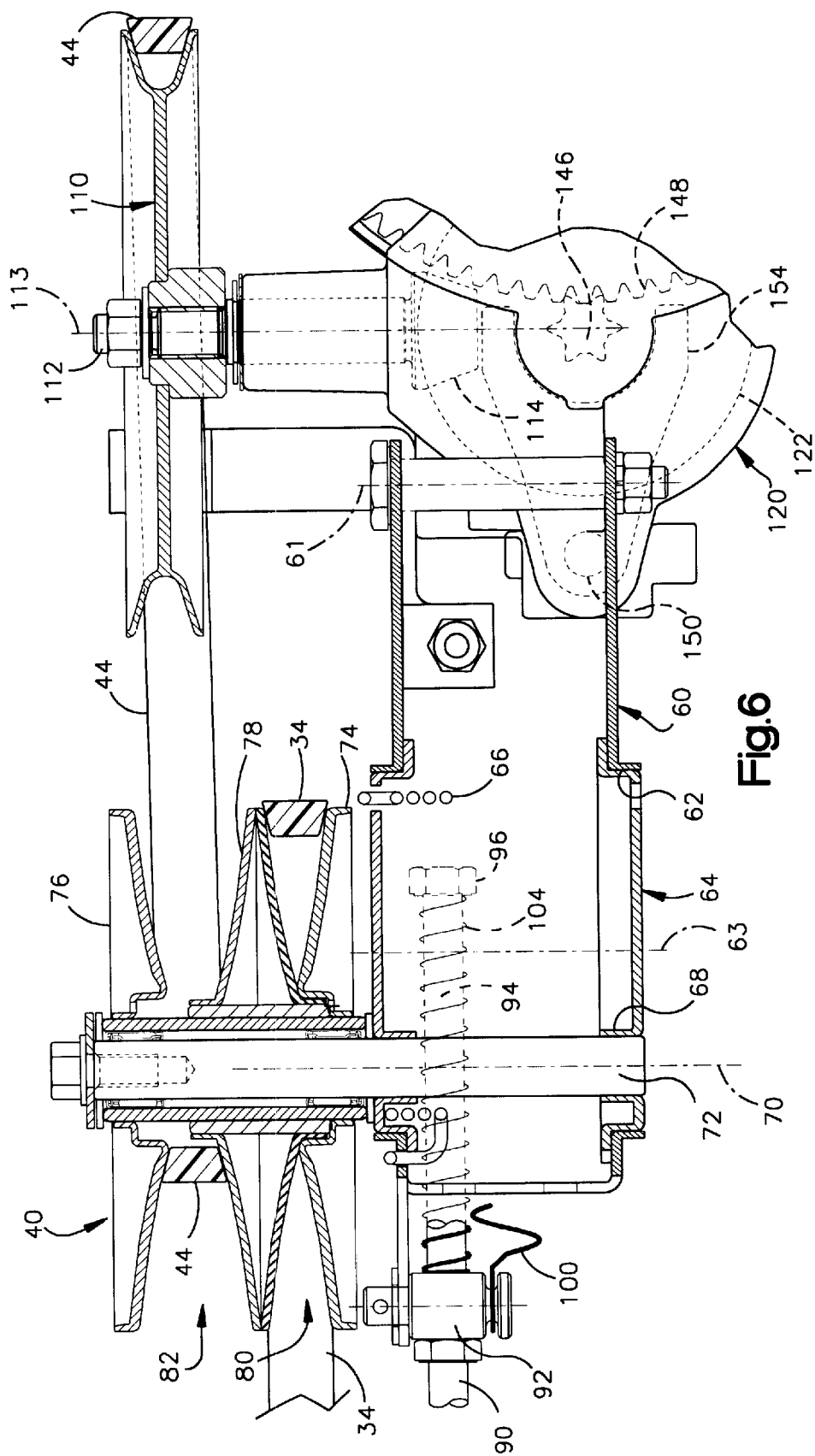
FIG. 6 is a schematic view, partially in section and taken generally along line 6—6 of FIG. 5, of the vehicle drive assembly in the driving condition shown in FIG. 5.

In order to transmit force from the main drive belt 34 to the transmission drive belt 44, the brake/accelerator rod 90 is moved downward as viewed in FIG. 5 (to the right as viewed in FIG. 6). This movement of the brake/accelerator rod 90 allows the clutch spring 100 to pivot the bracket arm 60 from the disengaged condition shown in FIGS. 5 and 6 to a slow or minimum speed condition as shown in FIGS. 7 and 8. The bracket arm 60 is pivoted in a clockwise direction about the pivot axis 61 on the transmission housing 57. This pivotal movement of the bracket arm 60 eliminates slack in the main drive belt 34. This pivotal movement initially is not effective to change the operating diameters of the variable diameter pulleys 80 and 82 in the variable speed pulley assembly 40. A small amount of force is, however, applied from the moving main drive belt 34, through the variable speed pulley assembly 40, to the transmission drive belt 44, to cause the transmission drive belt to attempt to rotate the fixed diameter transmission pulley 110.

When the tractor 10 is to be moved backward, the directional control transmission assembly 120 is engaged into a reverse drive condition. To do this, the shift actuator rod 150 is moved axially toward the left as viewed in FIGS. 11–13. The lateral movement of the shift actuator rod 150 causes the shift fork 154 and the shift collar 160 to be moved axially to the left, also. As the shift collar 160 moves toward the left, an arcuate leading end or nose 170 (FIG. 12) on each one of the pivot keys 134 engages the reverse bevel drive gear 124 and is pivoted radially inward, toward the central axis 126 of the directional control transmission assembly 120. This pivoting movement causes the noses 170 of the keys 134 to move into the slots 132 in the output shaft and enables the noses 170 to move radially inward of the reverse bevel drive gear 124 against the bias of the leaf spring 136.

At this time, the output shaft 130 is stationary and the drive pinion 114 may be either stationary or rotating very slowly depending upon whether or not the speed pedal brake 190 is engaged. If the speed pedal brake 190 is engaged, the fixed diameter transmission pulley 110 is not being rotated by the transmission drive belt 44 and the pinion 114 is not being rotated. However, if the speed pedal brake 190 is disengaged, the fixed diameter transmission pulley 110 is rotated very slowly by force from the transmission drive belt 44. This results in both the forward and reverse bevel gears 122 and 124 being rotated very slowly relative to the output shaft 30.

As the reverse bevel gear 124 rotates slowly relative to the output shaft 130, the slot 142 on the inner periphery of the reverse bevel gear aligns with the slot 132 on the outer circumference of the output shaft 130. The arcuate leading end portion 170 of the key 134 snaps into the slot 142 on the inside of the reverse bevel gear 124, because of the influence of the leaf spring 136. The output shaft 130 is coupled for rotation, through the key 134, with the reverse bevel gear 124. This results in drive force being transmitted from the drive pinion 114 through the reverse bevel gear 124 to the output shaft 130. Rotation of the output shaft 130 causes drive force to be transmitted to the differential 52 and thereby to the half shafts 54 and 56.

In order to move the tractor 10 forward, the shift actuator rod 50 is moved axially toward the right as viewed in FIGS. 11–13. This results in a similar operation as described above but the keys 134 move to the right as viewed in FIGS. 11–13. This results in the driving engagement of the forward bevel gear 122 with the output shaft 130.

If the speed at which the tractor 10 is to be driven is to be increased from the slow (minimum) speed, the effective diameter of the variable pulley 80 connected with the engine drive belt 34 must be decreased, that is, the axial extent of the pulley is increased. Simultaneously as this occurs, the effective diameter of the variable pulley 82 connected with the transmission drive belt 34 is increased moving the parts into the condition shown n FIGS. 9 and 10. This is accomplished under the influence of force applied by the engine drive belt 34 against the movable center pulley half 78 of the variable speed pulley assembly 40.

To accomplish this change, the variable speed pulley assembly 40 is moved away from the engine output pulley 30 by further pivoting of the bracket arm 60 by movement of the brake/accelerator rod 90. This causes the main drive belt 34 to move radially inward toward the axis 70. As this occurs, the transmission drive belt 44 is forced radially outward. As the transmission drive belt 44 is forced radially outward, the speed at which the fixed diameter transmission pulley 110 is driven is increased relative to the speed of the variable diameter output pulley 82.

The transmission drive belt 44, however, is a fixed length. In order to accommodate the increasing effective diameter of the variable output pulley 82 which engages the transmission drive belt 44, the axis 70 about which the variable speed pulley assembly 40 rotates must move closer to the axis 113 about which the fixed diameter transmission pulley 110 rotates. If the bracket arm 60 continues to be pivoted about only the pivot axis 61 on the transmission housing 57, the distance between the variable diameter output pulley 82 and the fixed diameter transmission pulley 110 will decrease only by a very small amount which is insufficient to accommodate the required change in the effective diameter of the variable diameter output pulley 82. At the same time, the pulley support shaft 72 in the variable speed pulley assembly 20 must be moved away from the engine output pulley 30 to cause the engine drive belt 34 to move radially inward and decrease the effective diameter of the variable diameter input pulley 80.

The required simultaneous change in the diameters of the two pulleys 80 and 82 is accomplished by combining the pivotal movement of the bracket arm 60 with an additional component of movement of the support shaft 72 for the two variable diameter pulleys 80 and 82. In the illustrated embodiment of the invention, this additional component of movement is accomplished by the eccentric 64.

The eccentric 64 is spring biased to cause the eccentric to rotate in a counterclockwise direction as viewed in FIGS. 5, 7 and 9. When the bracket arm 60 pivots in a clockwise direction about the pivot axis 61 on the transmission housing 57, the force applied by the transmission drive belt 44 against the variable diameter output pulley 82 causes the eccentric 64 to rotate in a clockwise direction against the influence of the eccentric biasing spring 66. This rotational movement of the eccentric 64 in the opening 62 in the bracket arm 60 combines with the pivotal movement of the bracket arm to move the variable speed pulley assembly 40 the necessary distance closer to the transmission housing 57, as can be seen from a comparison of FIGS. 5, 7 and 9.

If the engine stops turning while the transmission drive belt 44 is driving the wheels 26 and 28, the variable speed pulley assembly 40 may be interrupted with the belts 34 and 44 midway between the innermost and outermost positions. In order to restart the engine, it is necessary to move the brake/accelerator rod 90 all the way forward to engage a safety start switch (not shown). However, the friction forces between the belts 34 and 44 and the variable speed pulley assembly 40 are such that the force transmitted through the brake/accelerator rod 90 can not effect a sufficient change in the effective diameter of the two variable diameter pulleys 80 and 82. In this case, the clutch override spring 104 comes into play. When the driver of the tractor 10 exerts a substantial force against the speed pedal, the clutch override spring 104 is compressed and the brake/accelerator rod 90 is movable relative to the bracket arm 60, enabling the brake/ accelerator rod to be moved forward and the engine of the tractor 10 to be started.

At this point the variable speed drive assembly 40 is still in an intermediate condition so that force is transmitted through the main drive belt 34 and the transmission drive belt 44 to the rear wheels 26 and 28. Once the engine begins to start, the force applied by the drive belts 34 and 44 to the variable speed pulley assembly 40 causes the variable diameter pulleys 80 and 82 to immediately change in diameter to the minimum or slow speed condition.

The additional component of movement of the variable speed pulley assembly 40 can alternatively be provided using a linkage mechanism that does not include an eccentric. Such a linkage mechanism is shown in the second embodiment of the invention, illustrated in FIGS. 14–19. Parts of the second embodiment that are the same as corresponding parts of the first embodiment are given the same reference numerals.

In FIGS. 14–19, the vehicle drive assembly 12a includes a three-arm linkage mechanism 240 for supporting the variable speed pulley assembly 40 on the transmission housing 57. As in the first embodiment of the invention, the braking functions and the speed control functions of the tractor 10a are all handled by the same manual member (not shown, such as a speed pedal at the other end of the brake/accelerator rod 90), whose movement acts through the brake/accelerator rod.

The three arm linkage mechanism 240 (FIGS. 14 and 15) includes an elongate bracket arm 250. An inner end portion 252 of the bracket arm 250 is supported for pivotal movement on the pivot shaft 58 on the transmission housing 57, about the axis 61. An outer end portion 256 of the bracket arm 250 supports another pivot shaft 258.

The three arm linkage mechanism 240 also includes an elongate pulley support arm 260 having a central portion 262 and first and second opposite end portions 264 and 266. The central portion 262 of the pulley support arm 260 is supported for pivotal movement on the pivot shaft 258 on the outer end portion 256 of the bracket arm 250. The first end portion 264 of the pulley support arm 260 has another pivot shaft 268 that supports the variable speed pulley assembly 40. The variable speed pulley assembly 40 is thus supported for rotation on the pulley support arm 260.

The three arm linkage mechanism 240 also includes an elongate brake arm 270. The brake arm 270 has a central portion 272 and opposite first and second end portions 274 and 276. The central portion 272 of the brake arm 270 is supported on the pivot shaft 58 on the transmission housing 57 for pivotal movement relative to the transmission housing about the axis 61.

The first end portion 274 of the brake arm 270 has a split or forked configuration including two parts 280 and 282. The first part 280 has an end portion 284 disposed radially outward of the transmission drive belt 44 where the belt wraps around the transmission drive pulley 110. The end portion 284 serves as a braking element identical to that of the brake lever 192 described above with reference to FIG. 5. The second part 282 of the first end portion 274 of the brake arm 270 has a mounting pin 286. The brake/ accelerator rod 90 is connected to the mounting pin 286. Thus, manual speed control changes are transmitted through the brake/accelerator rod 90 directly to the brake arm 270. The brake/accelerator rod 90 directly pivots the brake arm 270 about the transmission housing 57 whenever the brake/ accelerator rod is moved.

Figure 15:
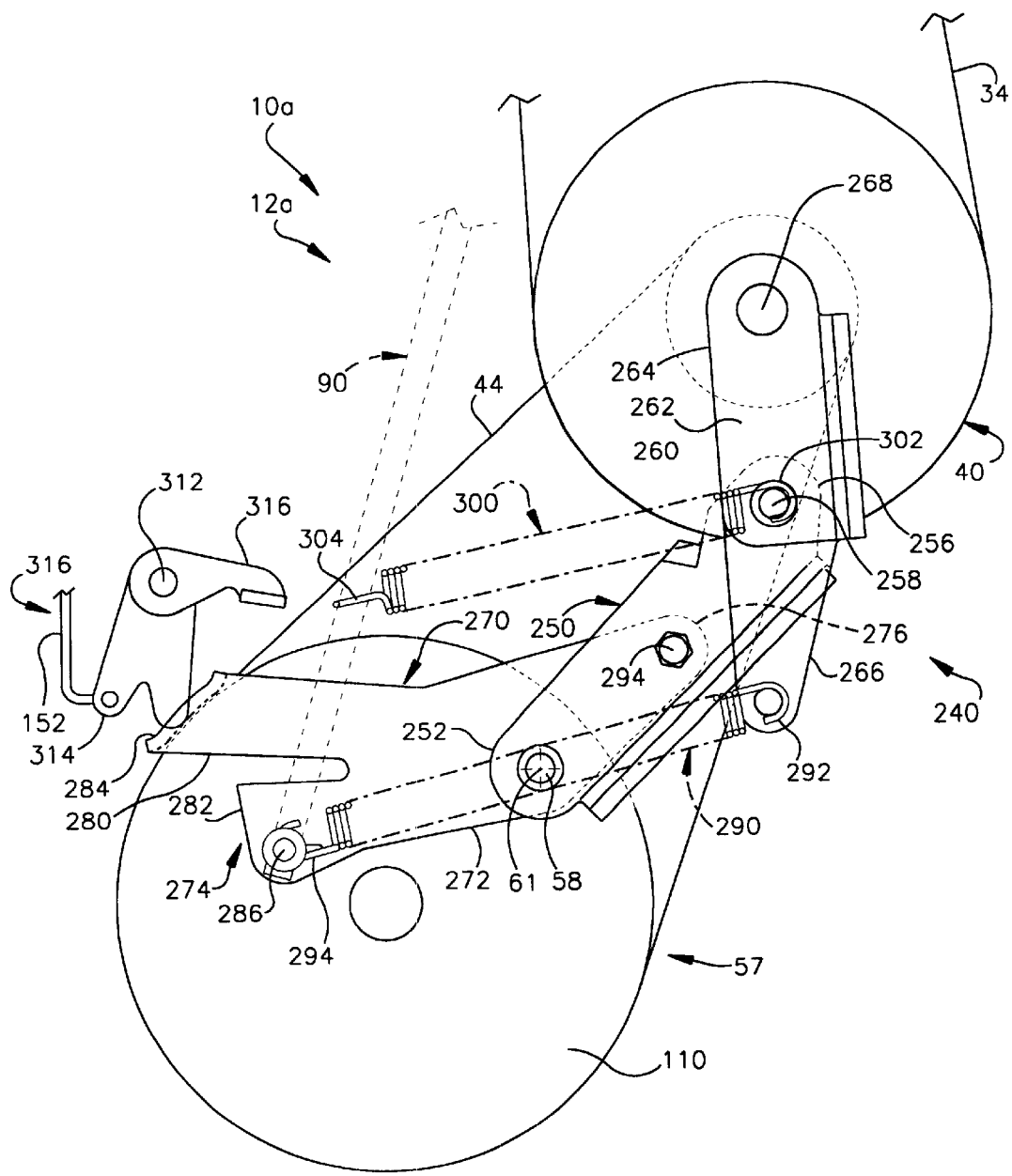
FIG. 15 is a sectional view similar to FIG. 3 of the vehicle drive assembly of FIG. 14.
Figure 16:
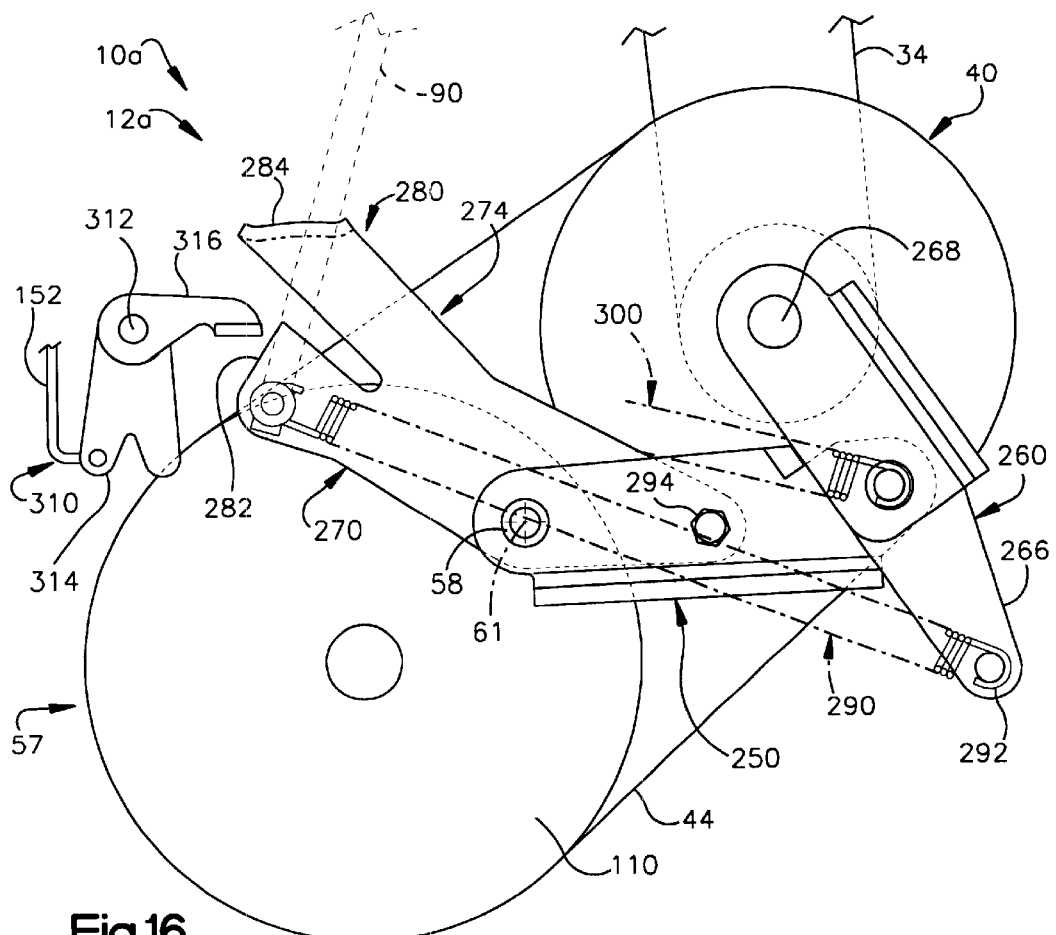
FIG. 16 is a sectional view similar to FIG. 15 of the vehicle drive assembly of FIG. 14, shown in a higher speed condition.

A first end 288 of a locator spring 290 is also connected to the mounting pin 286 on the second part 282 of the first end portion 274 of the brake arm 270. The locator spring 290 is a compression spring. The second end 292 of the locator spring 290 is connected to the second end portion 266 of the pulley support arm 260. The locator spring 290 acts between the pulley support arm 260 and the brake arm 270, to bias the pulley support arm, and thus the variable speed pulley assembly 40, into a slow speed condition as seen in FIG. 15—that is, clockwise about the pivot shaft 258 on the end of the bracket arm 250.

The second end portion 276 of the brake arm 270 is connected to the central portion of the bracket arm 250 by a fastener such as the bolt and nut 294. As a result, the brake arm 270 is connected to the bracket arm 250 at two places— first, at the location of the bolt and nut 294, and second, at the pivot shaft 58 on the transmission housing 57. Because of this two-point connection, the brake arm 270 is movable as one with the bracket arm 250. The brake/accelerator rod 90 thus directly pivots the bracket arm 250 as well as the brake arm 270 about the transmission housing 57 whenever the brake/accelerator rod is moved.

The brake arm 270 as illustrated is a separate piece from the bracket arm 250, for ease of manufacture. It should be noted that the brake arm 270 could be made as one piece with the bracket arm 250. Thus, the three arms 250, 260 and 270 of the linkage mechanism 240 would be only two arms, functioning the same.

The linkage mechanism 240 also includes a main spring 300. A first end 302 of the main spring 300 is connected at the pivot shaft 258 on the outer end portion 256 of the bracket arm 250—that is, at the pivot point for the pulley support arm 260. The second end 304 of the main spring 300 is connected to a fixed mounting pin (not shown) on the transmission housing 57. The main spring 300 acts between the transmission housing 57, on the one hand, and the pulley support arm 260 and the bracket arm 250, on the other hand, to pivot the arms 260 and 250 in a counterclockwise direction as viewed in FIG. 15 about the axis 61, that is, toward a slow speed condition.

The position of the pulley support arm 260 at any time relative to the bracket arm 250 is determined by two forces acting on the pulley support arm. First is the force from the belts 34 and 44 acting through the variable speed pulley assembly 40 into the pivot shaft 268, because the pivot shaft 268 is on the first end portion 264 of the pulley support arm 260. Second is the force of the locator spring 290 acting between the pulley support arm 260 and the brake arm 270. The locator spring 290 acts on the pulley support arm 260 in a manner to pivot the variable speed pulley 40 so as to keep tension on the transmission drive belt 44.

When the brake/accelerator rod 90 is not urged upward as viewed in FIG. 15 by manually applied force to the speed pedal, the main spring 300 pulls the pivot shaft 258 and thus the bracket arm 250 in a counterclockwise direction to the stop position shown in FIG. 15. The variable speed pulley 40 is in the disengaged position. As the bracket arm 250 thus pivots, the brake arm 270 moves also, because it is fixed for movement with the bracket arm. The pivoting movement of the brake arm 250 moves the braking element 284 on the brake arm into a braking position against the transmission drive belt 44 on the transmission pulley 110.

This movement of the brake arm 250 also acts on the brake/accelerator rod 90 and pulls the brake/accelerator rod in a downward direction as viewed in FIG. 15. The speed pedal is moved back to a starting or disengaged position.

Thus, when the operator does not press on the speed pedal, the variable speed pulley mechanism 40 automatically assumes the disengaged condition, and the speed pedal brake is actuated.

When the operator then presses on the speed pedal, speed change force is transmitted through the brake/accelerator rod 90 into the mounting pin 286 on the brake arm 280. The brake arm 270, and the bracket arm 250 which is fixed for movement with the brake arm, pivot about the shaft 58 and the axis 61.

As this simultaneous movement of the brake arm 270 and the bracket arm 250 occurs, the first thing that happens is that the speed pedal braking element 284 releases from the transmission pulley 110. Next, upon a little more movement of the brake/accelerator rod 90, the bracket arm 250 pivots enough so that the variable speed pulley 40 is moved in a direction to tighten the engine drive belt 34 on the variable speed pulley assembly 40. Upon additional movement of the brake/accelerator rod 90 and further pivotal movement of the bracket arm 250, the bracket arm and the pulley support arm 260 pivot to a position at which the variable speed pulley 40 moves toward the directional control transmission assembly 50 and starts to change the drive ratio between the engine drive belt 34 and the transmission drive belt 44.

The bracket arm 250 and the pulley support arm 260 pivot in opposite directions. Specifically, the bracket arm 250 pivots clockwise as viewed in FIGS. 15 and 16, and the pulley support arm 260 pivots in a counterclockwise direction as viewed in FIGS. 15 and 16.

As this occurs, the locator spring 290 is also acting on the pulley support arm 260. The geometry of the arms 250 and 260 is such that the combined forces on them cause the variable speed pulley assembly 40 to move in the correct path to simultaneously enable (a) changing of the drive ratio to "faster" and (b) movement of the variable speed pulley assembly 40 closer to the transmission drive pulley 110 as is needed to avoid stretching the transmission drive belt 44.

These actions go in the reverse order when the brake/accelerator rod 90 is released—the drive ratio changes to slower, then disengages, then the speed pedal brake 190 is automatically set.

For safety, a lawn tractor or garden tractor typically includes a mechanism for limiting the speed of the vehicle in reverse. This function is typically accomplished with a separate set of gears for reverse, having a different drive ratio.

In accordance with the present invention, the linkage mechanism 240 of FIGS. 14–19 includes a reverse speed limiter mechanism 310 for automatically limiting the speed of the vehicle 10a in reverse such that a separate set of gears is not needed.

The reverse speed limiter mechanism 310 includes a shaft 321 (FIGS. 14, 16 and 17) mounted on the transmission housing. This shaft 312 is connected by a rocker arm 314 with the directional control actuator mechanism 150. The action of the rod 314 is such that the shaft 312 rotates upon the operator shifting between forward, neutral and reverse. A blocking finger 316 is mounted on this shaft 312 for rotation with the shaft.

Figure 17:
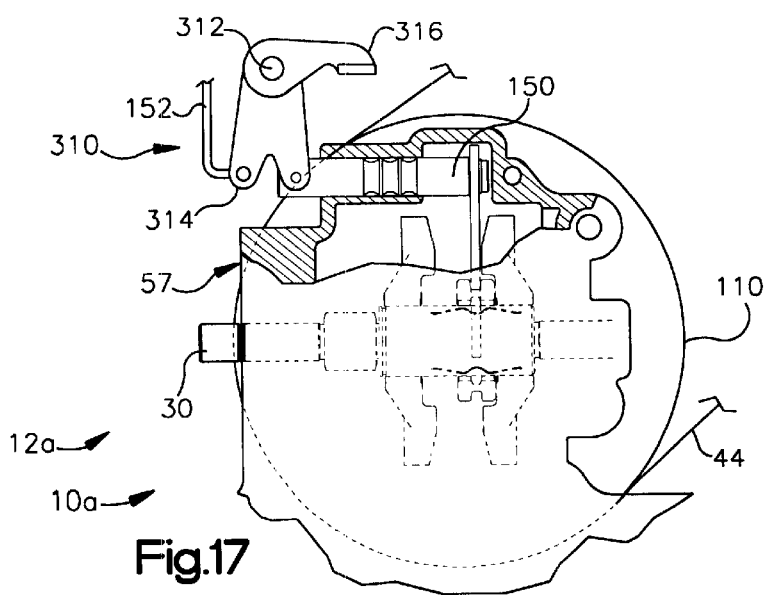
FIG. 17 is a partial sectional view of the vehicle drive assembly of FIG. 14 showing a reverse speed limiter assembly in a disengaged condition.
Figure 18:
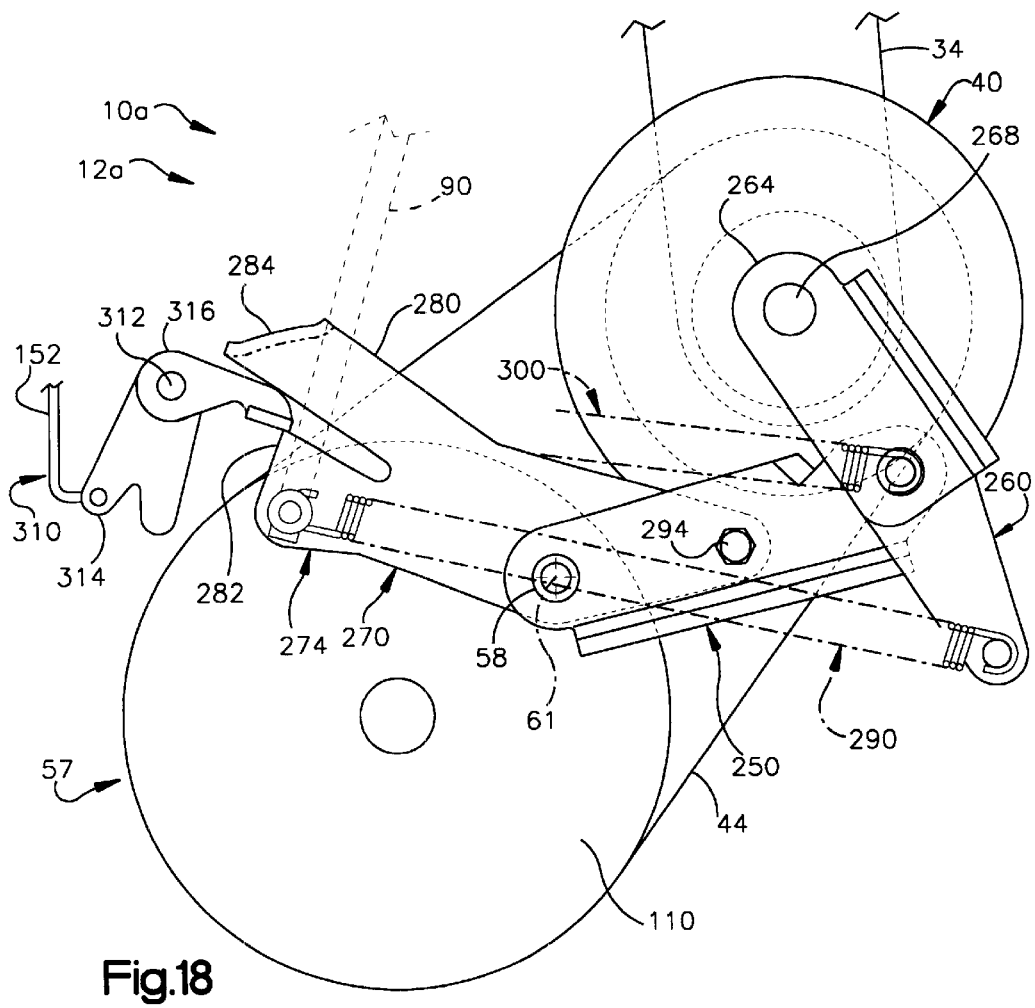
FIG. 18 is a sectional view similar to FIG. 16 of the vehicle drive assembly of FIG. 14, shown in a reverse speed limited speed condition.
Figure 19:
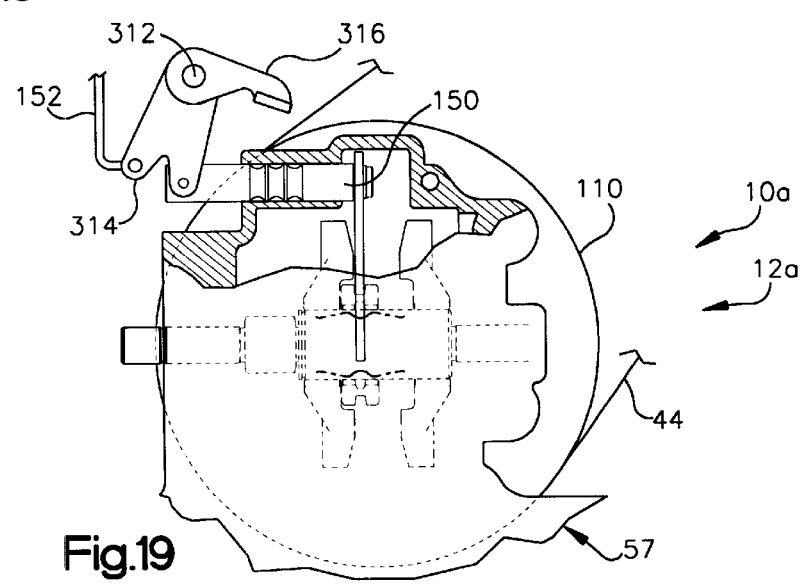
FIG. 19 is view similar to FIG. 17 showing the reverse speed limiter assembly in an engaged condition.

When the vehicle 10a is moved from neutral into the forward drive condition, the blocking finger 316 rotates into a position adjacent the second part 282 of the first portion 274 of the brake arm 270, but does not engage or block movement of the brake arm. This position is shown in FIG. 17.

When the vehicle 10a is moved into the reverse drive condition (FIGS. 18 and 19), the blocking finger 316 rotates into another position adjacent the second part 282 of the first portion 274 of the brake arm 270. Specifically, the blocking finger 316 rotates into a position in the path of movement of the second part 282 of the first portion 274 of the brake arm 270 as the brake arm moves in response to higher speed in reverse. Then, as the vehicle speed increases in reverse, via increased movement of the brake/accelerator rod 90, the second part 282 of the first portion 274 of the brake arm 270 engages the blocking finger 316. This engagement blocks further movement of the brake arm 270 and thus the brake/accelerator rod 90, and thus prevents any further increase in vehicle speed in the reverse drive condition.

Another advantageous feature of the engine drive assemblies 12 and 12a of the present invention is that they can be sold as one unit for mounting in a vehicle such as the tractor 10. Specifically, as to the first embodiment of the invention, the transmission housing 57 supports the bracket arm 60 and thus the variable speed pulley assembly 40 and the transmission drive belt 44. As to the second embodiment of the invention, the transmission housing 57 supports the bracket arm 250 and the brake arm 270 and the pulley support arm 260 and thus the variable speed pulley assembly 40 and the transmission drive belt 44. The transmission housing 57 in both cases includes the directional control transmission assembly and the output parts such as the half shafts of the rear axle. Thus, the only operative input connections needed to this unit are the engine drive belt 34 and the brake/accelerator rod 90, and the rear wheels 26 and 28 can be directly attached. This unit can also be designed to be reversed left to right, and top to bottom, as needed for mounting in different types of tractors.

From the above description of the invention, those skilled in the art will perceive improvements, changes and modifications in the invention. Such improvements, changes and modifications within the skill of the art are intended to be covered by the appended claims.

Having described the invention, We claim:

1. A vehicle drive assembly including:

a directional control transmission assembly operable between a forward drive condition and a reverse drive condition, a variable speed drive assembly, a transmission drive belt extending between said variable speed drive assembly and said directional control transmission assembly to transmit force from said variable speed drive assembly to said transmission assembly when said transmission assembly is in the forward drive condition and when said transmission assembly is in the reverse drive condition;

a main drive belt extending between said variable speed drive assembly and a source of power to transmit force to said variable speed drive assembly;

a linkage assembly which is operable to move said variable speed drive assembly toward said directional control transmission assembly to change said variable speed drive assembly from a first condition in which said directional control transmission assembly is driven at a relatively low speed by force transmitted from said variable speed drive assembly to said directional control transmission assembly through said transmission drive belt and a second condition in which said variable speed drive assembly is effective to drive said directional control transmission assembly at a high speed;

a movable member for transmitting manual speed change instructions to said variable speed drive assembly; and a brake movable by said movable member and operable between an engaged condition and a disengaged condition in response to movement of said movable member.

2. A vehicle drive assembly as set forth in claim 1 wherein said brake moves from the disengaged condition to the engaged condition as said variable speed drive assembly moves from the relatively low first condition to a stop condition.

3. A vehicle drive assembly as set forth in claim 1 further comprising means for limiting speed of the vehicle when in the reverse drive condition, said means comprising a stop member movable into a stop position that blocks movement of said variable speed drive assembly beyond a predetermined speed point in said direction of movement to a higher speed in the reverse drive direction.

4. A vehicle drive assembly as set forth in claim 1 wherein said linkage assembly comprises a first arm supported on said directional control transmission assembly for pivotal movement relative to said directional control transmission assembly and a second arm supported on said first arm for pivotal movement relative to said first arm, said first and second arms pivoting in opposite directions upon movement of said variable speed drive assembly toward said directional control transmission assembly.

5. A vehicle drive assembly as set forth in claim 1 wherein said linkage assembly comprises a multiple arm assembly including first and second and third arms, said drive assembly further including a spring acting between said first arm and said linkage assembly to tension said transmission drive belt.

6. A vehicle drive assembly as set forth in claim 1 wherein said linkage assembly includes a first tension spring acting to tension said main drive belt, and a second tension spring acting to tension said transmission drive belt.

7. A vehicle drive assembly as set forth in claim 1 wherein said brake comprises a brake lever supported on said directional control transmission assembly for pivotal movement in response to movement of said movable member.

8. A vehicle drive assembly as set forth in claim 7 wherein said directional control transmission assembly includes a transmission drive pulley and wherein said brake lever has a portion engageable with said transmission drive belt or pulley upon movement of said brake to the engaged condition.

9. A vehicle drive assembly as set forth in claim 1 further comprising a housing, said directional control transmission assembly being disposed in said housing, said variable speed drive assembly and said transmission drive belt and said linkage assembly being supported on said housing.

10. A vehicle drive assembly as set forth in claim 9 wherein said linkage assembly and said variable speed drive assembly and said transmission drive belt and said housing are provided as one assembled unit for assembly into the vehicle.

11. A vehicle drive assembly including:
   a directional control transmission assembly operable between a forward drive condition and a reverse drive condition,
   a variable speed drive assembly,
   a transmission drive belt extending between said variable speed drive assembly and said directional control transmission assembly to transmit force from said variable speed drive assembly to said transmission assembly when said transmission assembly is in the forward drive condition and when said transmission assembly is in the reverse drive condition; and
   a main drive belt extending between said variable speed drive assembly and a source of power to transmit force to said variable speed drive assembly;
   said directional control transmission assembly comprising a rigid, non-bending key that simultaneously slides and pivots to effect movement of said directional control transmission assembly into either the forward condition or the reverse drive condition.

12. A vehicle drive assembly as set forth in claim 11 wherein said directional control transmission assembly comprises rotatable forward and reverse drive gears, said movable key enabling movement of said directional control transmission assembly into the forward drive condition and the reverse drive condition without the need to line up gear teeth on said forward and reverse drive gears.

13. A vehicle drive assembly as set forth in claim 11 wherein said movable key is movable by a shift collar along a slot in an output shaft.

14. A vehicle drive assembly as set forth in claim 11 further comprising means for limiting speed of the vehicle when in the reverse drive condition, said means comprising a stop member movable into a stop position that blocks movement of said variable speed drive assembly beyond a predetermined speed point in said direction of movement to a higher speed in the reverse drive direction.

15. A vehicle drive assembly as set forth in claim 11 comprising a first arm supported on said directional control transmission assembly for pivotal movement relative to said directional control transmission assembly and a second arm supported on said first arm for pivotal movement relative to said first arm, said first and second arms pivoting in opposite directions upon movement of said variable speed drive assembly toward said directional control transmission assembly.

16. A vehicle drive assembly as set forth in claim 11 wherein said directional control transmission assembly comprises rotatable forward and reverse drive gears, and wherein said movable key is slidable along a slot in an output shaft to effect movement of said directional control transmission assembly into the forward drive condition and into the reverse drive condition.

17. A vehicle drive assembly as set forth in claim 16 wherein said movable key is pivotable into a slot in said forward drive gear to effect the forward drive condition and is pivotable into a slot in said reverse drive gear to effect the reverse drive condition.

18. A vehicle drive assembly as set forth in claim 11 further comprising a housing, said directional control transmission assembly being disposed in said housing, said variable speed drive assembly and said transmission drive belt being supported on said housing.

19. A vehicle drive assembly as set forth in claim 18 wherein said variable speed drive assembly and said transmission drive belt and said housing are provided as one assembled unit for assembly into the vehicle.

20. A vehicle drive assembly a set forth in claim 11 further comprising a movable member for transmitting manual speed change instructions to said variable speed drive assembly, and a brake movable by said movable member and operable between an engaged condition and a disengaged condition in response to movement of said movable member.

21. A vehicle drive assembly as set forth in claim 20 wherein said brake moves from the disengaged condition to the engaged condition as said variable speed drive assembly moves from a relatively slow first condition to a stop condition.

22. A vehicle drive assembly as set forth in claim 20 wherein said brake comprises a brake lever supported on said directional control transmission assembly for pivotal movement in response to movement of said movable member.

23. A vehicle drive assembly as set forth in claim 22 wherein said directional control transmission assembly includes a transmission drive pulley and wherein said brake lever has a portion engageable with said transmission drive belt or pulley upon movement of said brake to the engaged condition.

24. A vehicle drive assembly including:

a directional control transmission assembly operable between a forward drive condition and a reverse drive condition, a variable speed drive assembly, a transmission drive belt extending between said variable speed drive assembly and said directional control transmission assembly to transmit force from said variable speed drive assembly to said transmission assembly when said transmission assembly is in the forward drive condition and when said transmission assembly is in the reverse drive condition;

a main drive belt extending between said variable speed drive assembly and a source of power to transmit force to said variable speed drive assembly; and a linkage assembly which is operable to move said variable speed drive assembly toward said directional control transmission assembly to change said variable speed drive assembly from a first condition in which said directional control transmission assembly is driven at a relatively low speed by force transmitted from said variable speed drive assembly through said transmission drive belt to said directional control transmission assembly and a second condition in which said variable speed drive assembly is effective to drive said directional control transmission assembly at a high speed;

said linkage assembly comprising a first arm supported on said directional control transmission assembly for pivotal movement relative to said directional control transmission assembly and a second arm supported on said first arm for pivotal movement relative to said first arm, said first and second arms pivoting in opposite directions upon movement of said variable speed drive assembly toward said directional control transmission assembly;

wherein said second arm has first and second opposite end portions and a central portion, said central portion of said second arm being connected with said first arm, said variable speed drive assembly being rotatably mounted on said first end portion of said second arm, said drive assembly further comprising a spring acting between said first arm and said second end portion of said second arm.

25. A vehicle drive assembly as set forth in claim 24 further comprising a second spring acting between said second arm and said directional control transmission assembly.

26. A vehicle drive assembly including:

a directional control transmission assembly operable between a forward drive condition and a reverse drive condition, a variable speed drive assembly, a transmission drive belt extending between said variable speed drive assembly and said directional control transmission assembly to transmit force from said variable speed drive assembly to said transmission assembly when said transmission assembly is in the forward drive condition and when said transmission assembly is in the reverse drive condition;

a main drive belt extending between said variable speed drive assembly and a source of power to transmit force to said variable speed drive assembly; and a linkage assembly which is operable to move said variable speed drive assembly toward said directional control transmission assembly to change said variable speed drive assembly from a first condition in which said directional control transmission assembly is driven at a relatively low speed by force transmitted from said variable speed drive assembly through said transmission drive belt to said directional control transmission assembly and a second condition in which said variable speed drive assembly is effective to drive said directional control transmission assembly at a high speed;

said linkage assembly comprising a first arm supported on said directional control transmission assembly for pivotal movement relative to said directional control transmission assembly and a second arm supported on said first arm for pivotal movement relative to said first arm, said first and second arms pivoting in opposite directions upon movement of said variable speed drive assembly toward said directional control transmission assembly;

further comprising a first tension spring acting between said first arm and said directional control transmission assembly and a second tension spring acting between said first arm and said second arm, said first and second springs extending upon movement of said variable speed drive assembly toward said directional control transmission assembly.

27. A vehicle drive assembly including:

a directional control transmission assembly operable between a forward drive condition and a reverse drive condition, a variable speed drive assembly, a transmission drive belt extending between said variable speed drive assembly and said directional control transmission assembly to transmit force from said variable speed drive assembly to said transmission assembly when said transmission assembly is in the forward drive condition and when said transmission assembly is in the reverse drive condition;

a main drive belt extending between said variable speed drive assembly and a source of power to transmit force to said variable speed drive assembly; and a linkage assembly which is operable to move said variable speed drive assembly toward said directional control transmission assembly to change said variable speed drive assembly from a first condition in which said directional control transmission assembly is driven at a relatively low speed by force transmitted from said variable speed drive assembly through said transmission drive belt to said directional control transmission assembly and a second condition in which said variable speed drive assembly is effective to drive said directional control transmission assembly at a high speed;

said linkage assembly comprising a first arm supported on said directional control transmission assembly for pivotal movement relative to said directional control transmission assembly and a second arm supported on said first arm for pivotal movement relative to said first arm, said first and second arms pivoting in opposite directions upon movement of said variable speed drive assembly toward said directional control transmission assembly;

wherein said directional control transmission assembly comprises a rigid, non-bending key that simultaneously slides and pivots to effect movement of said directional control transmission assembly into either the forward condition or the reverse drive condition.

28. A vehicle drive assembly including:
a directional control transmission assembly operable between a forward drive condition and a reverse drive condition,
a variable speed drive assembly,
a transmission drive belt extending between said variable speed drive assembly and said directional control transmission assembly to transmit force from said variable speed drive assembly to said transmission assembly when said transmission assembly is in the forward drive condition and when said transmission assembly is in the reverse drive condition;
a main drive belt extending between said variable speed drive assembly and a source of power to transmit force to said variable speed drive assembly;
a linkage assembly which is operable to move said variable speed drive assembly toward said directional control transmission assembly to change said variable speed drive assembly from a first condition in which said directional control transmission assembly is driven at a relatively low speed by force transmitted from said variable speed drive assembly to said directional control transmission assembly through said transmission drive belt and a second condition in which said variable speed drive assembly is effective to drive said directional control transmission assembly at a high speed;
a movable member for transmitting manual speed change instructions to said variable speed drive assembly; and
a brake movable by said movable member and operable between an engaged condition and a disengaged condition in response to movement of said movable member;
wherein said directional control transmission assembly comprises a rigid, non-bending key that simultaneously slides and pivots to effect movement of said directional control transmission assembly into either the forward condition or the reverse drive condition.

29. A vehicle drive assembly including:
a housing;
a directional control transmission assembly in said housing and operable between a forward drive condition and a reverse drive condition,
a variable speed drive assembly supported on said housing;
a transmission drive belt extending between said variable speed drive assembly and said directional control transmission assembly to transmit force from said variable speed drive assembly to said transmission assembly when said transmission assembly is in the forward drive condition and when said transmission assembly is in the reverse drive condition;
a main drive belt extending between said variable speed drive assembly and a source of power to transmit force to said variable speed drive assembly; and
a linkage assembly supported on said housing, said linkage assembly being operable to move said variable speed drive assembly toward said directional control transmission assembly to change said variable speed drive assembly from a first condition in which said directional control transmission assembly is driven at a relatively low speed by force transmitted from said variable speed drive assembly through said transmission drive belt to said directional control transmission assembly and a second condition in which said variable speed drive assembly is effective to drive said directional control transmission assembly at a relatively high speed;
wherein said directional control transmission assembly comprises a rigid, non-bending key that simultaneously slides and pivots to effect movement of said directional control transmission assembly into either the forward condition or the reverse drive condition.

30. A vehicle drive assembly including:
a directional control transmission assembly operable between a forward drive condition and a reverse drive condition,
a movable variable speed drive assembly,
a movable member for transmitting manual speed change instructions to said variable speed drive assembly;
a transmission drive belt extending between said variable speed drive assembly and said directional control transmission assembly to transmit force from said variable speed drive assembly to said transmission assembly when said transmission assembly is in the forward drive condition and when said transmission assembly is in the reverse drive condition;
a main drive belt extending between said variable speed drive assembly and a source of power to transmit force to said variable speed drive assembly;
a linkage assembly which is operable to move said variable speed drive assembly toward said directional control transmission assembly to change said variable speed drive assembly from a first condition in which said directional control transmission assembly is driven at a relatively low speed by force transmitted from said variable speed drive assembly through said transmission drive belt to said directional control transmission assembly and a second condition in which said variable speed drive assembly is effective to drive said directional control transmission assembly at a high speed; and
means for limiting speed of the vehicle in the reverse drive condition, comprising a stop member movable by said movable member into a stop position that blocks movement of said variable speed drive assembly beyond a predetermined point in said direction of movement to a higher speed in the reverse drive direction;
wherein said directional control transmission assembly comprises a rigid, non-bending key that simultaneously slides and pivots to effect movement of said directional control transmission assembly into either the forward condition or the reverse drive condition.

* * * * *